United States Patent [19]
Atkins

[11] 3,966,266
[45] June 29, 1976

[54] SKID CONTROL SYSTEM

[75] Inventor: Thomas M. Atkins, Ann Arbor, Mich.

[73] Assignee: Kelsey-Hayes Company, Romulus, Mich.

[22] Filed: Nov. 13, 1974

[21] Appl. No.: 523,426

Related U.S. Application Data

[63] Continuation-in-part of Ser. No. 393,727, Sept. 4, 1973, abandoned.

[52] U.S. Cl. .............................. 303/21 P; 303/20
[51] Int. Cl.² ............................................. B60T 8/08
[58] Field of Search ............... 188/181; 303/20, 21; 307/16 R; 317/5; 324/161–162; 340/53, 62; 180/82 R, 105 B

[56] References Cited
UNITED STATES PATENTS

| | | | |
|---|---|---|---|
| 3,017,145 | 1/1962 | Yarber | 303/20 X |
| 3,467,444 | 9/1969 | Leiber | 303/21 BE |
| 3,523,712 | 8/1970 | Leiber | 303/21 CG |
| 3,615,120 | 10/1971 | Yamazaki et al. | 303/21 BE |
| 3,625,572 | 9/1971 | Marouby | 303/21 BE |
| 3,650,575 | 3/1972 | Okamoto | 188/181 C X |
| 3,652,136 | 3/1972 | Schlitz et al. | 303/21 BE |
| 3,663,070 | 5/1972 | Scharlack | 303/20 X |
| 3,707,311 | 12/1972 | Sharp | 303/21 CG |
| 3,710,186 | 1/1973 | Sharp | 317/5 |
| 3,729,169 | 4/1973 | MacDuff | 303/21 F X |
| 3,734,573 | 5/1973 | Davis et al. | 303/21 BE X |
| 3,790,227 | 2/1974 | Dozier | 303/21 BE |
| 3,804,470 | 4/1974 | Slavin et al. | 303/21 BE |
| 3,811,526 | 5/1974 | Adahan | 303/21 CF X |
| 3,832,008 | 8/1974 | Leiber et al. | 303/21 BE |

Primary Examiner—Stephen G. Kunin
Attorney, Agent, or Firm—Harness, Dickey & Pierce

[57] ABSTRACT

A skid control system utilizing a skid detector which is responsive to wheel deceleration, a skid recovery detector which is responsive to wheel acceleration, a holding circuit including a capacitor for modifying the response of the system in accordance with the level of charge on the capacitor, and charging and discharging circuits for charging and discharging the capacitor in accordance with various skid condition related signals.

67 Claims, 17 Drawing Figures

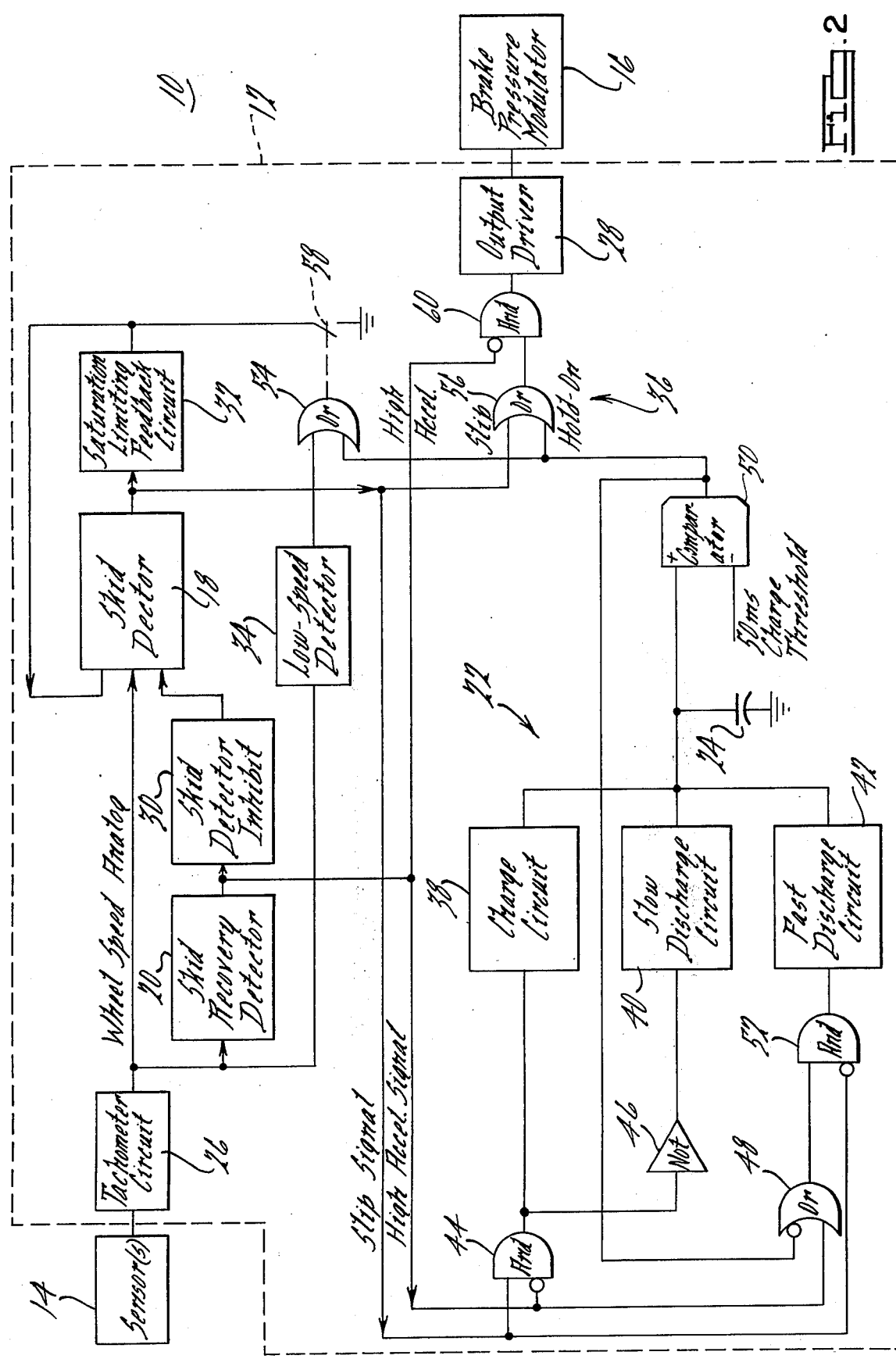

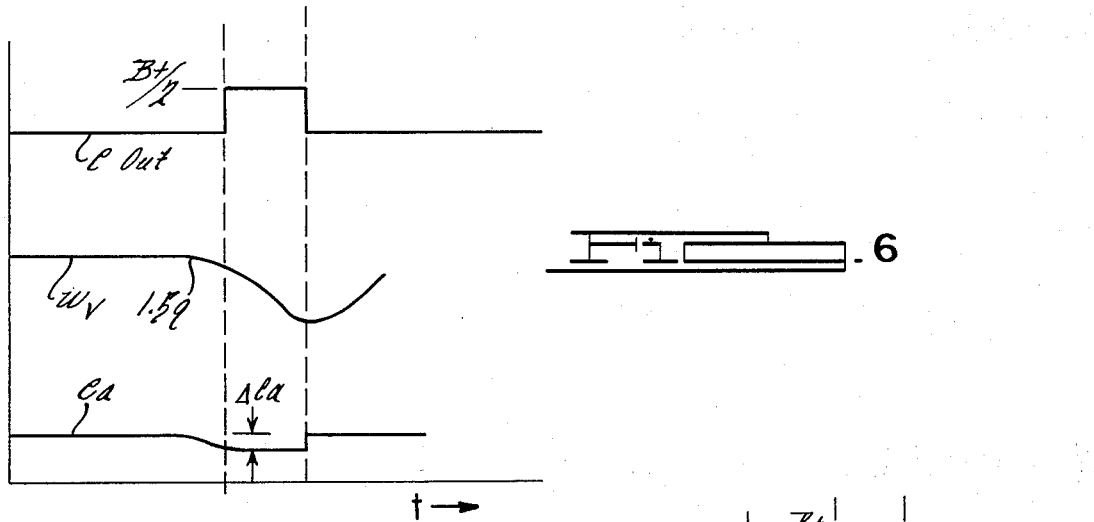
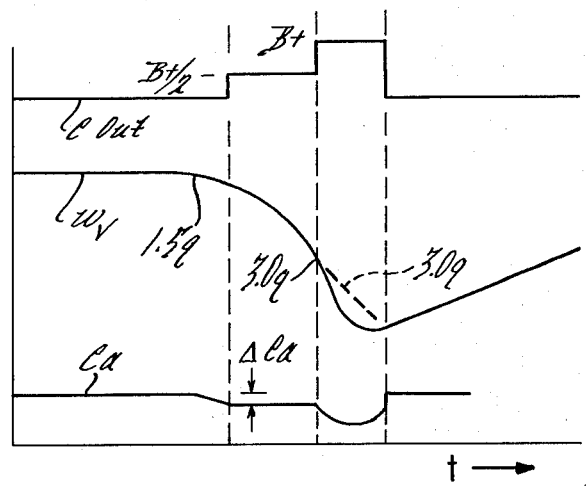
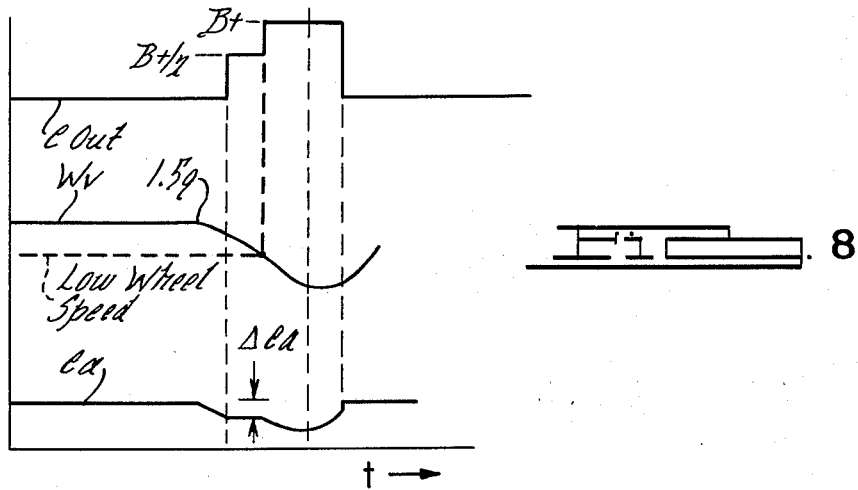

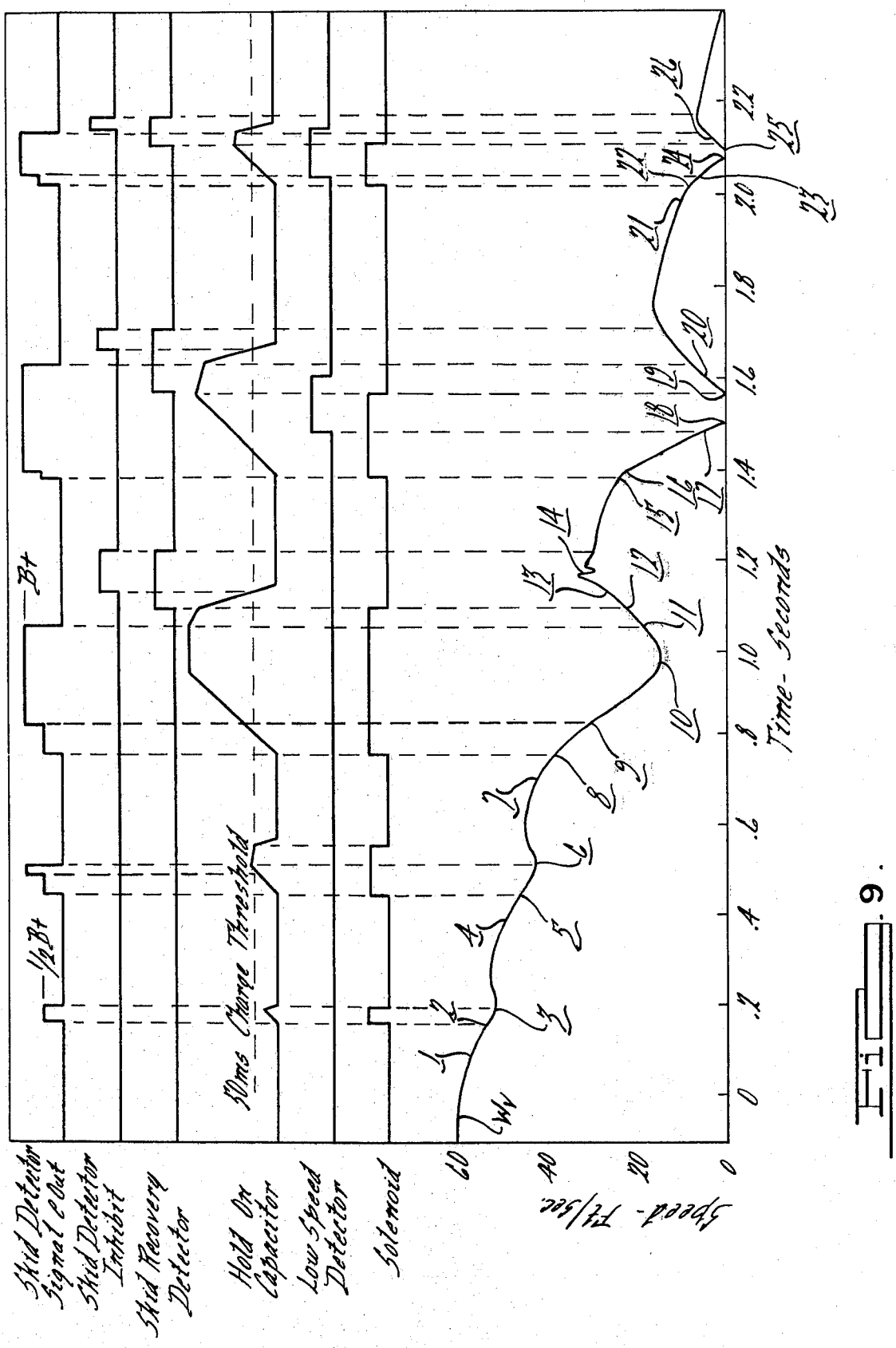

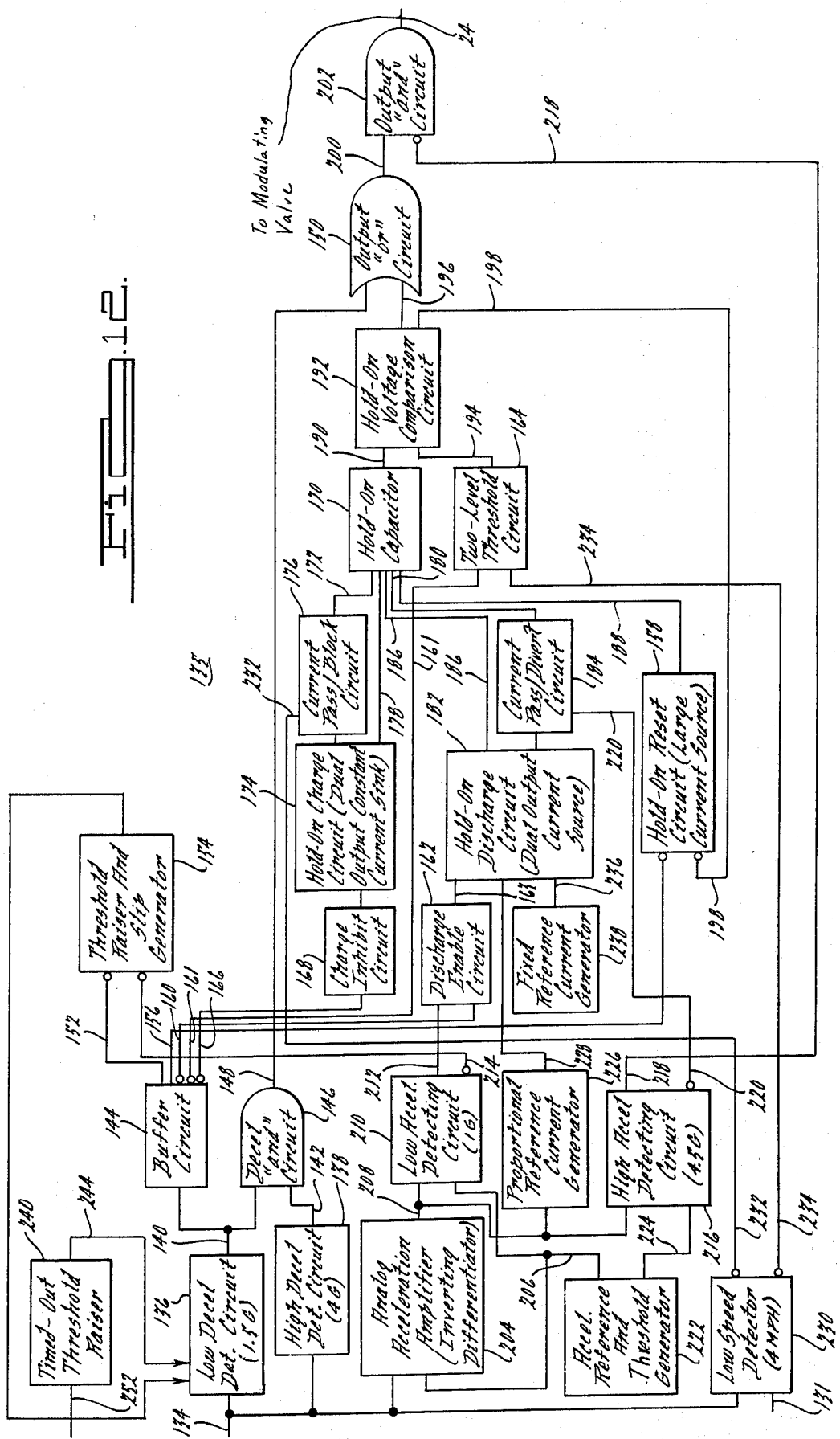

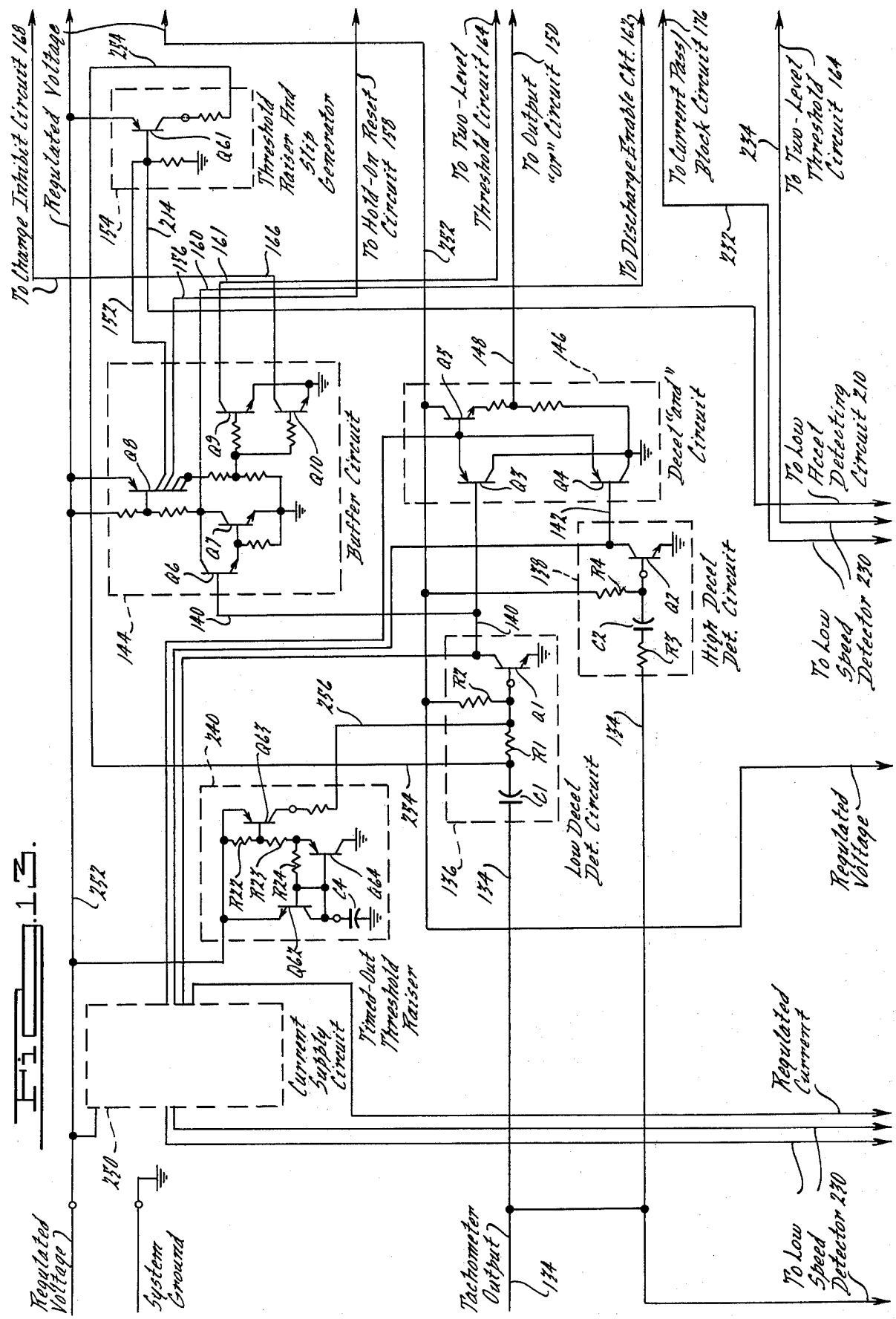

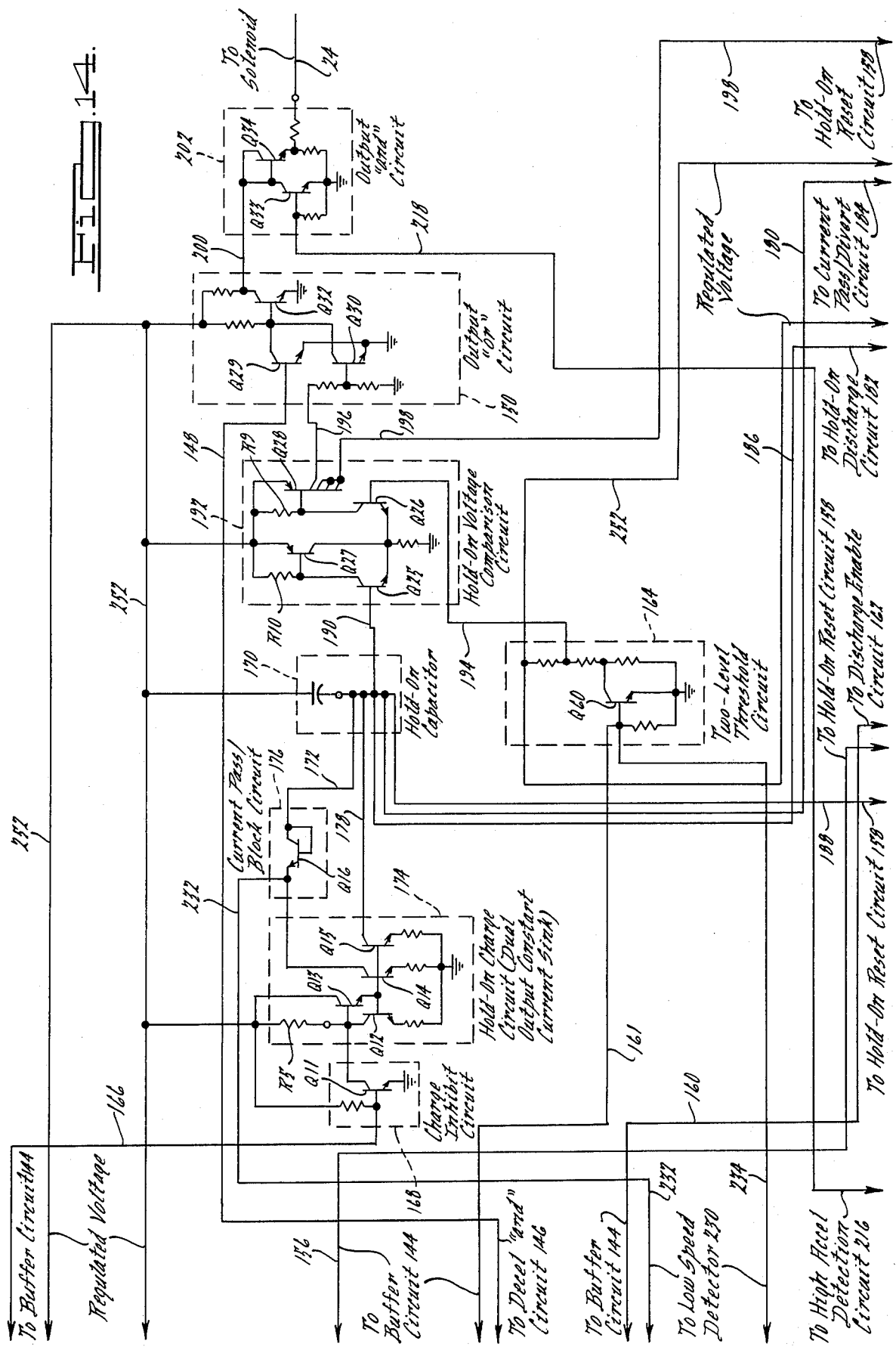

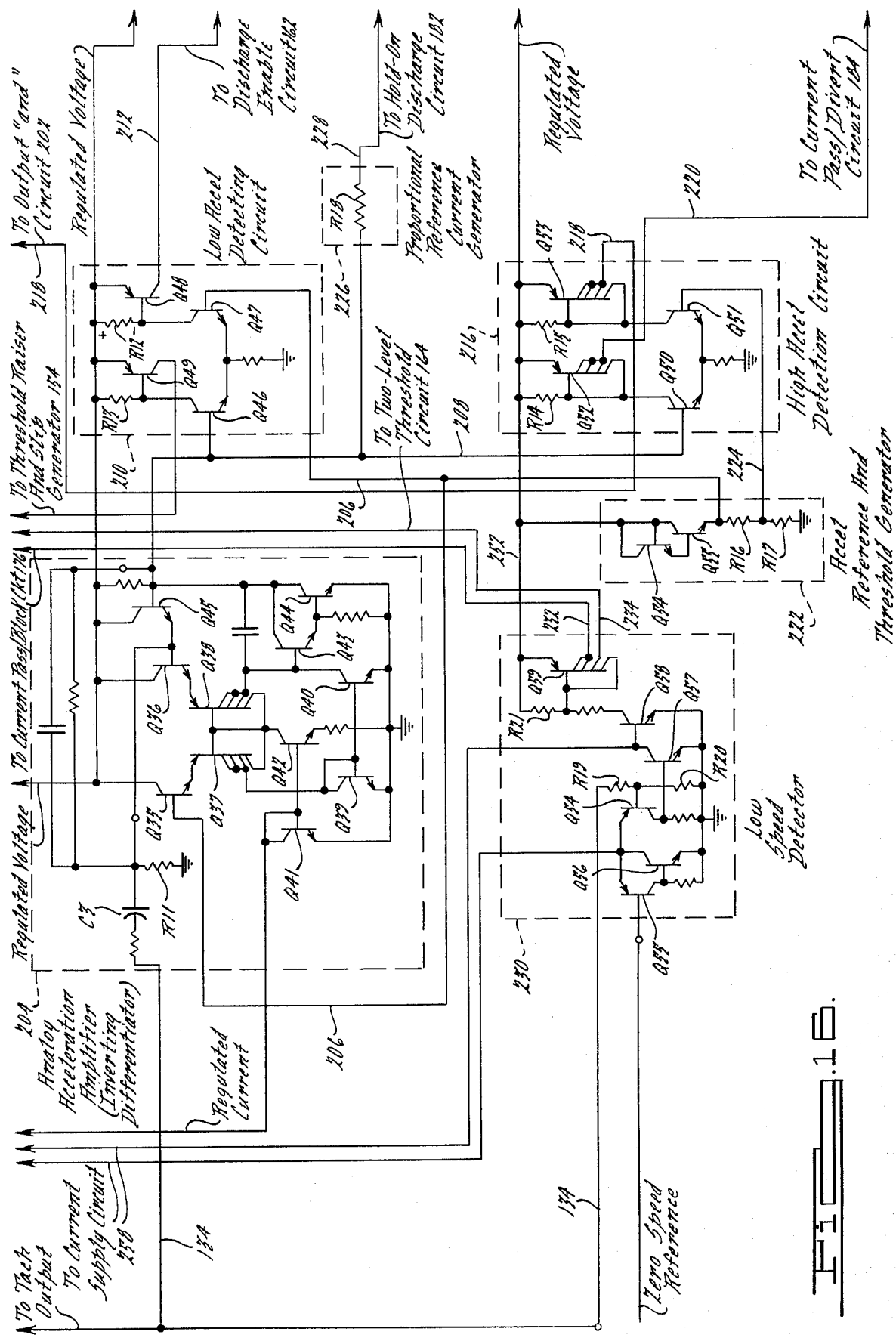

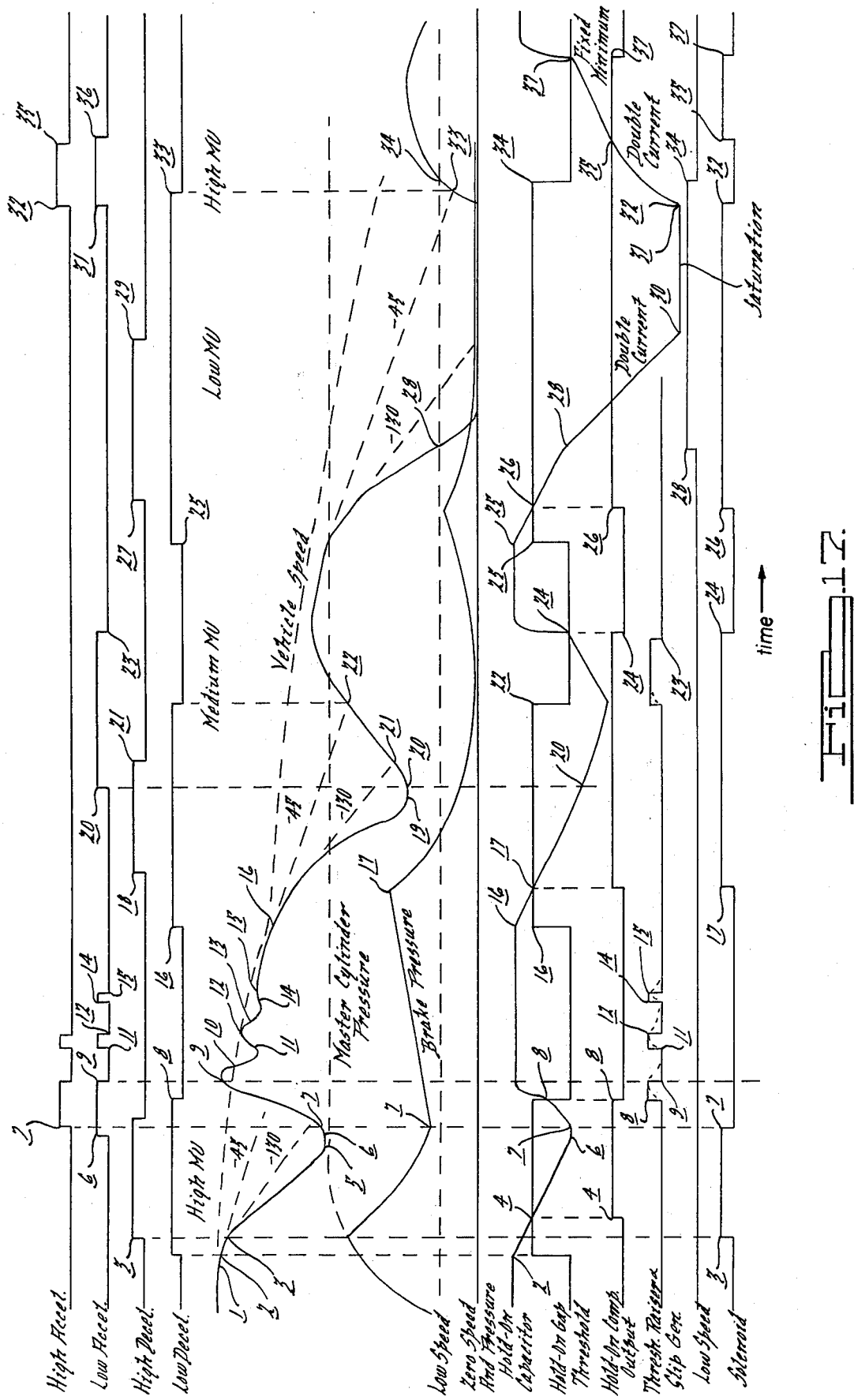

3,966,266

1

SKID CONTROL SYSTEM

CROSS REFERENCE TO A RELATED APPLICATION

This application is a continuation-in-part of my co-pending application entitled "Skid Control System", Ser. No. 393,727, filed Sept. 4, 1973 now abandoned, and assigned to the same assignee as this application.

BACKGROUND AND SUMMARY OF THE INVENTION

The present invention relates to a skid control system which includes a skid detector which is responsive to the deceleration of the vehicle wheel and which, in one embodiment, provides an output signal after a predetermined amount of slip of the wheel is incurred, and in another embodiment, provides an output signal when a predetermined wheel deceleration is attained. In the one embodiment, the skid detector includes means for delaying the response of wheel deceleration detector until the wheel has continued to decelerate above the threshold for a predetermined period. The skid detector is preferably used in combination with a holding circuit which, in selected instances, maintains the brakes relieved after the dissipation of the output of the skid detecting circuit for a predetermined period and a skid recovery detector which overrides the holding circuit. According to the present invention, this holding circuit advantageously includes a circuit for providing either one or two preestablished rates of charge of the capacitor and two preestablished rates of discharge of the capacitor to modify the performance of the skid control system in accordance with such factors as the elapsed time that the wheel is in a skid condition as indicated by the skid detector and the existence of a signal from the skid recovery detector.

In a first embodiment of an exemplary skid control system according to the present invention, the holding circuit capacitor is charged at one preestablished rate in response to an output from the skid detector. An output signal from the skid recovery detector, however, overrides the skid detector output to terminate the charging of the hold-on circuit capacitor. Any time the hold-on capacitor is not being charged, i.e. there is no skid detector output signal, or if there is a skid detector output signal but it is overridden by a skid recovery detector output signal, the hold-on circuit is discharged at a preestablished low discharge rate. The hold-on capacitor is discharged at a high rate when there is no skid detector output signal and the charge on the hold-on capacitor is below the predetermined level which maintains the brakes in the released condition. The hold-on capacitor is also discharged at the high rate in response to an output signal from the skid recovery detector when there is no skid detector output signal.

The first embodiment of the skid control system according to the present invention is also provided with a circuit for limiting the saturation of the skid detector to adjust the duration of the skid detector output signal in accordance with the level of wheel deceleration, i.e. the skid detector output signal duration is increased for wheel decelerations above a preselected deceleration level. The saturation limiting circuit is rendered inoperative to increase the duration of the skid detector output signal either during sufficiently low wheel speeds or during the period that the hold-on capacitor charge level is above the pre-established level.

2

In a second embodiment of a skid control system according to the present invention, the hold-on capacitor is charged at a low rate when the wheel exceeds a low deceleration threshold and is charged at a high rate when the wheel exceeds a low deceleration threshold and the wheel speed is below a predetermined low speed. The hold-on capacitor is generally discharged at a rate which is in accordance with the level of wheel acceleration. When the wheel exceeds a high level of wheel acceleration the hold-on capacitor discharge rate is substantially increased. The charge level on the hold-on capacitor is compared with two reference charge levels. A threshold representative of a lower charge level is in effect when the wheel exceeds the low deceleration threshold or the wheel speed is below a predetermined low speed. A threshold representative of a higher charge level is in effect at other times.

Further features and provisions of this invention will be apparent in view of the detailed description of the preferred embodiments set forth hereinafter.

BRIEF DESCRIPTION OF THE DRAWINGS

FIG. 2 is a block diagram of a first exemplary embodiment of a skid control system according to the present invention;

FIGS. 6, 7 and 8 are graphical illustrations of the performance of the skid detecting circuit of FIG. 5;

FIG. 9 is a graphical illustration of the performance of the first exemplary embodiment of a skid control system according to the present invention which is shown in FIG. 2;

FIG. 12 is a more specific block diagram of the skid control system of FIG. 11;

FIG. 13 is a first portion of a schematic diagram of the skid control system of FIGS. 11 and 12;

FIG. 14 is a second portion of a schematic diagram of the skid control system of FIGS. 11 and 12;

FIG. 16 is a fourth portion of a schematic diagram of the skid control system of FIGS. 11 and 12; and FIG. 17 is a graphical illustration of the performance of the second exemplary embodiment of a skid control system according to the present invention shown in FIGS. 11–16.

DETAILED DESCRIPTION OF THE PREFERRED EMBODIMENTS

Figure 1:
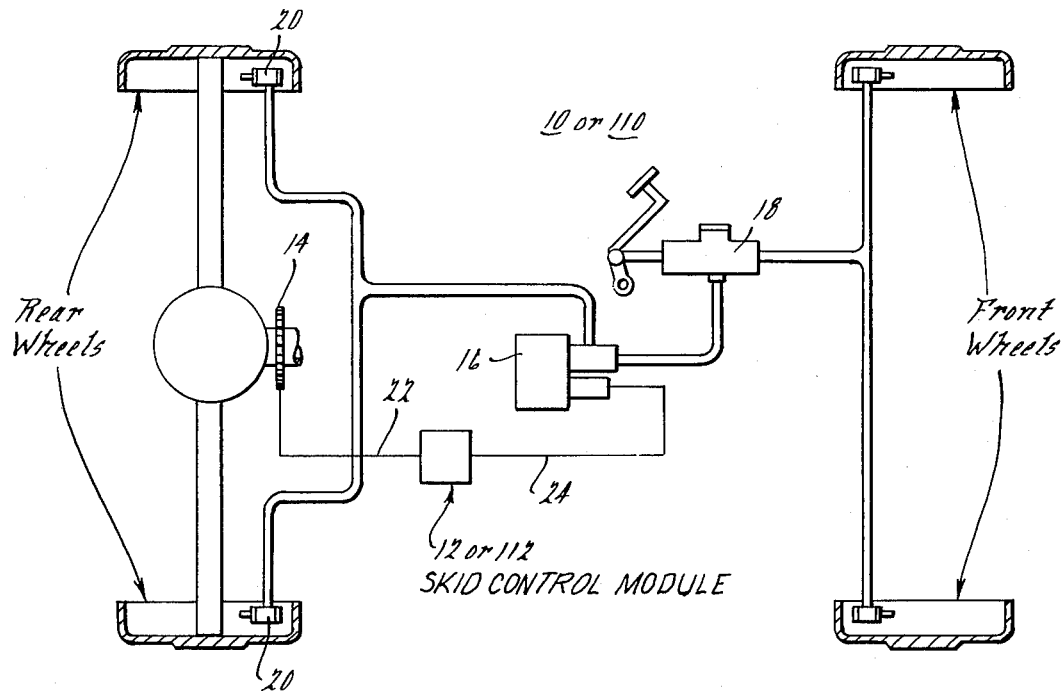
FIG. 1 is a highly schematic view of an automobile braking system incorporating a skid control system according to the present invention.

In FIG. 1, exemplary skid control systems 10 and 110 according to the present invention are illustrated. The skid control systems 10 and 110 include a skid control module or computer 12 or 112, respectively, a propeller shaft speed sensor 14 and a brake pressure modulator 16. The speed sensor 14 is preferably of the variable reluctance type which provides a signal having a frequency proportional to the average speed of the rear wheels. This is accomplished, for example, by mounting the speed sensor 14 to sense the rotational speed of the propeller shaft between the vehicle transmission and the differential as disclosed in the patent of Liggett, U.S. Pat. No. 3,604,966, issued Sept. 14, 1971. Alternatively, the average speed of the rear wheels may be sensed by sensing the speed at each of the rear wheels using respective wheel speed sensors and averaging the two rear wheel speed signals. The brake pressure modulator 16 is connected between the rear brake pressure port of the vehicle master cylinder 18 and the rear wheel brake cylinders 20. It is preferably hydraulically-operated, as opposed to vacuum operated, so as to provide predictable and immediate reductions in brake pressure on command of the skid control module 12 so that the slip of the vehicle wheel may be closely controlled at low levels during the skid control cycle. Hydraulically-operated brake pressure modulating valves are known in this art, and accordingly, a detailed description thereof will not be provided herein. Preferably, the valve should have a gradual reapply mode as illustrated in the charts of FIGS. 9 and 17.

The skid control module 12 is connected to the speed sensor 14 by a conductor 22 and to the solenoid portion of the brake pressure modulator 16 by a conductor 24.

In FIG. 2, a first exemplary embodiment 10 of a skid control system according to the present invention is illustrated in which the skid control module 12 (enclosed by dashed lines) is seen to include a skid detector 18, a skid recovery detector 20, and a holding circuit 22 with the latter including a holding capacitor 24 as an energy storage element. The skid control module 12 further includes the usual tachometer circuit 26 for converting pulses from the wheel speed sensor(s) into an analog signal representative of the wheel speed and the usual output driver 28 which provides an amplified electrical signal to the brake pressure modulator 16.

Generally speaking, the skid detector 18 receives the wheel speed signal and provides an output signal which results in an output signal from the output driver 28 which causes the brake pressure modulator 16 to relieve the brakes. The brakes are reapplied in the case of a minor skid condition upon dissipation of the output signal of the skid detector 18. As will be more fully explained hereinafter, the output signal of the skid detector 18 persists under certain severe skid conditions until the wheel has been allowed to spin up a predetermined degree depending on the severity of the skid. Also, under certain severe skid conditions, the holding circuit 22 is effective to maintain the output signal of the output driver 28 so as to continue to relieve the brakes for a predetermined time after dissipation of the output signal of the skid detector 18 in accordance with the severity of the skid condition. If the wheel attains a certain deceleration threshold and spins up at a predetermined rate after attaining that threshold, the skid recovery detector 20 provides an output signal which takes precedence over the output signal of the holding circuit 22 and the skid detector 18 and causes removal of the output signal of the output driver 28 resulting in reapplication of the brake pressure.

Various accesssory functions are provided by a skid detector inhibit circuit 30 which prevents the skid detector 18 from providing an output signal during the existence of a skid recovery detector output signal, a saturation limiting feedback circuit 32 for adjusting the response of the skid detector when the wheel deceleration exceeds an upper deceleration threshold, a low speed detector 34 for disabling the saturation limiting feedback circuit to provide delayed termination of the skid detector output signal when the wheel speed is below a low speed threshold, and an output logic section 36 for establishing the response of the output driver 28 to the aforementioned functional circuits.

With reference now to the holding circuit 22 of FIG. 2, the capacitor 24 is connected to each of a charge circuit 38, a slow discharge circuit 40, and a fast discharge circuit 42 whereby the charge accummulated on capacitor 24 may be controlled. The operation of the charge circuit 38, the slow discharge circuit 40 and the fast discharge circuit 42 are controlled by various logic elements in accordance with the parameters of the particular skid condition encountered. More particularly, an AND gate 44 is provided which receives a slip signal, i.e., the output of the skid detector 18 at one terminal and a NOT or inverted high acceleration signal, i.e., the output of the skid recovery detector 20, at its other terminal. Consequently, the AND gate 44 provides an output signal when an output signal from the skid detector 18 exists indicating a skid condition and no output signal from the skid recovery detector exists indicating that there has been no high wheel acceleration. Under those conditions, the charge circuit 38 connects a source of supply potential to the capacitor 24 in response to the output signal from the AND gate 44. The output of the AND gate 44 is inverted by a NOT gate 46 and delivered to the slow discharge circuit 40 so that the capacitor 24 is slowly discharged to ground through the slow discharge circuit 40 when an output from the AND gate 44 does not exist. An OR gate 48 receives a NOT or inverted output of a comparator 50 of the holding circuit 22 and the high acceleration signal from the skid recovery detector 20 so as to provide an output signal when either the skid recovery detector 20 provides an output signal or the comparator 50 does not provide an output signal. The output of the OR gate 48 is provided to one terminal of an AND gate 52. The other terminal of the AND gate 52 receives a NOT or inverted slip signal from the skid detector 18 so that the AND gate 52 provides an output signal when no skid detector output signal exists and either a high acceleration signal from the skid recovery detector 20 exists or no output signal from the comparator 50 exists. The output signal of the AND gate 52 is provided to the fast discharge circuit 42 so as to discharge the capacitor 24 to ground at a high rate when the output signal from the AND gate 52 exists. The comparator 50 provides an output signal whenever the charge on the capacitor 24, received at one of its terminals, exceeds a 50 millisecond charge threshold reference which is received at its other terminal. The 50 millisecond charge threshold reference is a potential representing the level which the capacitor 24 reaches when charged for 50 milliseconds by the current supplied by the charge circuit 38. The output of the comparator 50 is not only received by the OR gate 48, but also by an OR gate 54 and an OR gate 56.

The OR gate 54 also receives the output of the low speed detector 34 and is effective to close a switch 58 either in the event that the wheel speed is below a predetermined threshold as sensed by the low speed detector 34 or if the charge on capacitor 24 exceeds the 50 millisecond charge threshold as determined by the comparator 50. The switch 58 is connected to the saturation limiting feedback circuit 32 for inhibiting that circuit by shunting its output to ground when switch 58 is closed.

The OR gate 56 receives the output from the comparator 50 at one of its terminals as previously described and the output from the skid detector 18 at its other terminal. The OR gate 56 supplies an output signal either when the charge on the capacitor 24 exceeds the 50 millisecond charge threshold as determined by the comparator 50 or the skid detector 18 provides an output signal indicating that the wheel is in a skid condition. The output of the OR gate 56 is provided to one terminal of an AND gate 60 which also receives a NOT or inverted high acceleration signal from the skid recovery detector 20 at its other terminal. The AND gate 60 provides an output to the output driver 28 when the wheel is not experiencing a high acceleration as indicated by the absence of an output signal from the skid recovery detector 20, and a skid condition exists either as determined by an output signal from the skid detector 18 or an output signal from the comparator 50.

In view of the preceding, it will be appreciated that the output driver 28 is inhibited if the skid recovery detector 20 indicates that the wheel is experiencing an acceleration above a threshold level regardless of any other condition. Additionally, the output driver 28 is activated in the absence of the high acceleration signal from the skid recovery detector 20, if the skid detector 18 provides an output signal or if the charge on the capacitor 24 is above the 50 millisecond charge threshold. This functioning, as well as the function of the other accessory units such as the skid detector inhibit circuit 30 and the low speed detector 34, will be more apparent in the light of the graphical representation of the operation of the circuit of FIG. 2 shown in FIG. 8.

Figure 3:
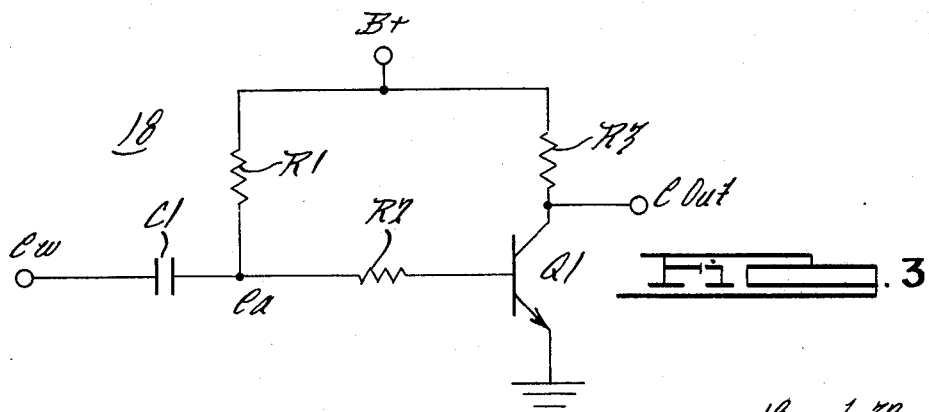
FIG. 3 is a circuit diagram of a first exemplary embodiment of a skid detecting circuit for the embodiment of FIG. 2.

In FIG. 3, an exemplary embodiment of a skid detector 18 is illustrated. The skid detector 18 includes a transistor Q1 which receives the potential $e_w$ from the tachometer circuit 26 representative of wheel speed through capacitor C1 and resistor R2. The collector/emitter circuit of the transistor Q1 is connected between a source of potential B+ and ground through a resistor R3 connected to its collector. A resistor R1 and a resistor R2 connect the base of the transistor Q1 to the source of potential B+. The output of the skid detector 18 is obtained through a suitable connection at the collector of transistor Q1 as shown. Normally, the transistor Q1 is held on through the above described connections since base current flows through resistors R1 and R2 to forward bias the transistor Q1. Consequently, the output potential $e_{out}$ at the collector of transistor Q1 is normally in a low condition.

Figure 4:
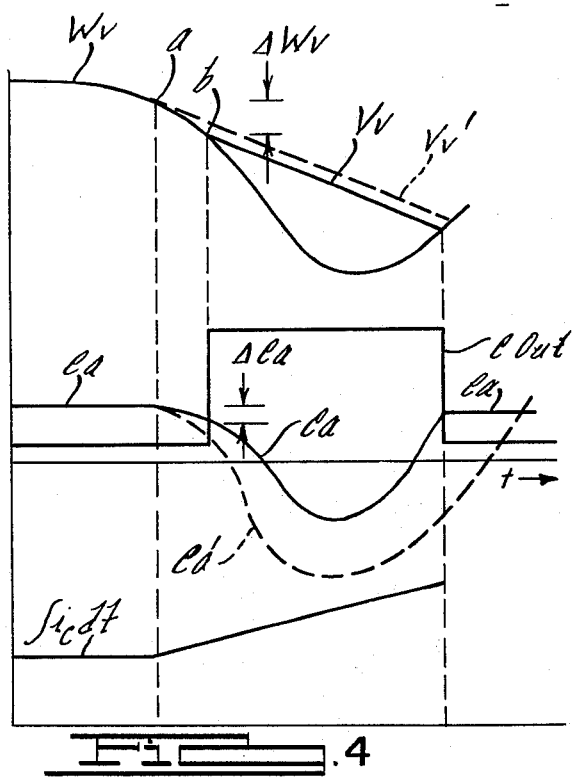
FIG. 4 is a graphical illustration of the performance of the skid detecting circuit of FIG. 3.

For simplicity, the operation of the skid detector 18 will be first described without consideration of the saturation limiting feedback circuit 32. With reference now to FIG. 4 in which a graphical representation is provided of the response of the skid detector 18, the operation of the skid detector 18 will be described in detail. In FIG. 4, the actual wheel speed $w_v$ is seen to fall rapidly off during heavy braking so as to reach a predetermined deceleration threshold at point a on the curve. Subsequent to the attainment of the predetermined deceleration threshold at point a, the potential at the input of the skid detector 18 is pulled down so as to draw capacitor current $i_c$, as also illustrated, from the source of supply B+ through R1. If it were not for the resistor R1, the potential at $e_a$ would follow the potential $e_w$ as illustrated by the dashed line $e_a'$ in the graphical representation of FIG. 4. However, by virtue of the resistor R1, and the consequent current flow into the capacitor $i_c$, the actual potential $e_a$ at the junction of resistors R1 and R2 is pulled down more gradually than the wheel speed signal $e_w$, generally as a differential function of the signal $e_w$, with the difference between the signals $e_a$ and $e_a'$ being representative of the time integral of the current $i_c$ into the capacitor as illustrated in FIG. 4. Eventually, as the potential $e_a$ is reduced, the transistor Q1 will be turned off. However, this cannot occur until the potential $e_a$ has been reduced to an amount equal to the voltage drop across the resistor R2 since, prior to that occurrence, the transistor Q1 will continue to be forward biased. In other words, since initial state of potential $e_a$ is intermediate the potential at the base of transistor Q1 and the source of potential B+ as established by the voltage divider formed by resistors R1 and R2, the reverse biasing of transistor Q1 in response to a deceleration equal to or in excess of the threshold value at point a is delayed until the wheel has continued to decelerate to point b so that the total reduction in the potential $e_a$ has equalled, and hence overcome, the prebias established by the voltage drop across resistor R2. This voltage drop is designated in FIG. 4 as $\Delta e_a$. When the transistor Q1 is turned off by reverse biasing, the output terminal of transistor Q1 is brought to its high state as illustrated in FIG. 4. As can be seen in FIG. 4, a degree of slip $\Delta w_v$ is required after the acceleration threshold is attained at a prior to an output signal from the skid detector 18 indicating that a skid condition exists. As the wheel speed increases after release of the brake effected by turning off the transistor Q1, the value of $e_a$ increases until it reaches a sufficient level to turn transistor Q1 on thereby pulling the output signal $e_{out}$ back to its former low level. Thus, it can be seen that the wheel is allowed to spin up to a certain degree, depending on the extent of the downward excursion of the signal $e_a$, prior to the extinguishment of the output signal $e_{out}$ of the skid detector 18.

It will be noticed that the transistor Q1 is illustrated in FIG. 4 as being saturated until reverse biasing at which time the transistor fully turns off. In practice, the transistor Q1 is prevented from turning fully off by a feedback circuit not shown in FIG. 3.

Figure 5:
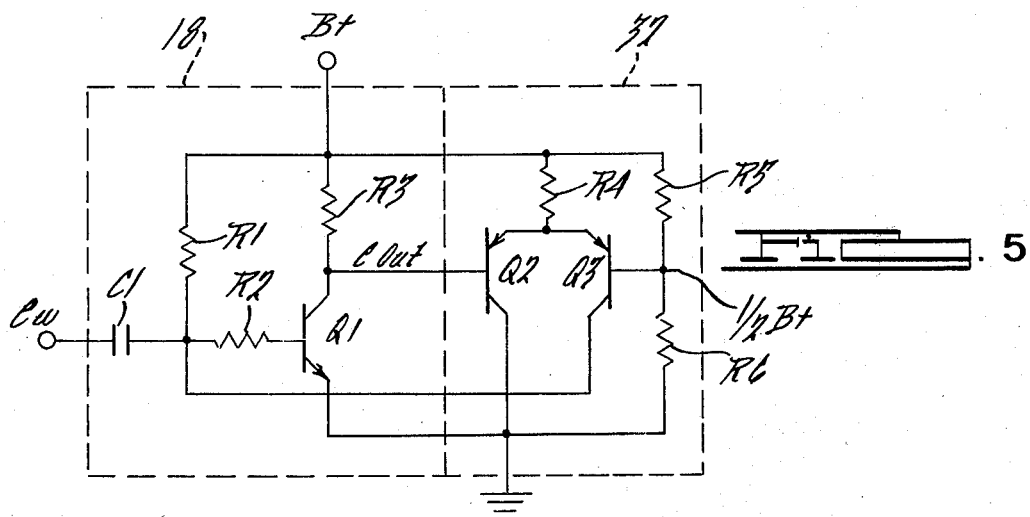
FIG. 5 is a second exemplary embodiment of a skid detecting circuit for the embodiment of FIG. 2.

In FIG. 5, the skid detector circuit 18 is shown in operative relationship with the saturation limiting feedback circuit 32. The saturation limiting feedback circuit 32 essentially comprises a voltage comparator having transistors Q2 and Q3 which compare the voltage at $e_{out}$ to the voltage between resistors R5 and R6. Essentially, resistors R5 and R6 are connected between the source of supply potential B+ and ground potential and are of equal value so as to provide a potential at their junction equal to ½B+. The transistors Q2 and Q3 are biased by a common resistor R4 connecting their emitters to the source of potential B+. The collector of transistor Q2 is connected to ground while the collector of transistor Q3 is connected to the junction of resistors R1 and R2 of the skid detector 18 to influence the potential $e_a$. The base of transistor Q2 is connected to the collector of transistor Q1 to receive the output of the skid detector 18 $e_{out}$ while the base of the transistor Q3 is connected to the potential ½B+ at the connection of the voltage divider resistors R5 and R6.

With regard to the operation of the circuit of FIG. 5, as the output potential $e_{out}$ of the skid detector 18 increases, Q2 starts turning off so as to start turning on Q3 so as to decrease the impedance in the path from the source of potential B+ through resistor R4 and transistor Q3 to the junction of voltage divider resistors R1 and R2 so as to increase the potential $e_a$. As the potential $e_a$ increases, the transistor Q1 becomes more conductive so as to pull down the output potential $e_{out}$ of the skid detector 18. The feedback from the transistor Q3 to the junction of resistors R1 and R2 maintains the values $e_{out}$ equal to the potential ½B+ at the junction of resistors R5 and R6. Consequently, the transistor Q1 is in Class A operation and may be readily turned fully on, i.e., saturated. Hence the response time is shortened relative to a condition whereby the transistor Q1 is turned fully off as previously described.

The above mode of operation can best be seen with reference to FIG. 6 in which the wheel is seen to decelerate to 1.5 g., the deceleration threshold of the skid detector 18, at which time the signal $e_a$ is clamped to a value $\Delta e_a$ less than its original value so as to clamp the output signal $e_{out}$ of the skid detector to ½B+. In this condition, the output signal $e_{out}$ of the skid detector 18 will be removed almost immediately after the wheel deceleration falls below the first deceleration threshold of 1.5 g. Importantly, as the wheel continues to decelerate and reaches a second threshold level, for example, 3.0g., the transistor Q3 can no longer supply enough current to the junction between resistors R1 and R2 to keep the signal $e_a$ clamped to the value $\Delta e_a$ less than $e_a$ due to the current limiting effect of resistor R4. As a result, the signal $e_a$ will drop in accordance with the drop in wheel velocity so as to turn transistor fully off so that the signal $e_{out}$ is brought to B+. The extinguishment of the output signal $e_{out}$ of the skid detector 18 after the threshold of 1.5 g. is no longer exceeded is delayed in accordance with the degree to which the signal $e_a$ has fallen below the clamped value so as to allow the wheel to spin up a related degree.

From the above, it can be seen that the saturation limiting feedback circuit 32 provides two threshold levels and with respect to each the response of the skid detector 18 differs. After the first threshold level is reached, but before the second threshold level is reached, the output signal of the skid detector 18 is removed immediately after the wheel deceleration fall below the threshold level so as to permit immediate reapplication of the brakes. This is desirable since the fact that the second threshold level has not been exceeded indicates that the skid is not a severe one and that optimum braking can be obtained by immediate reapplication of the brakes. On the other hand, if the wheel deceleration rises above the second threshold level, a severe skid has been experienced, and consequently, the wheel is allowed to spin up a degree depending on the severity of the skid, i.e., the extent to which the deceleration of the wheel exceeded the second threshold value of 3 g. and the time period that the wheel deceleration had exceeded the second threshold value.

As described previously, the skid control system 10 is provided with an OR gate 54 which provides an output signal either in response to an output signal from the low speed detector 34 or an output signal from the comparator 50. Additionally, the output signal from the OR gate 54 is effective to close the switch 58 to shunt the output of the saturation limiting feedback circuit 32 to ground to render the saturation limiting feedback circuit 32 ineffectual. This condition can be best seen with reference to the graphical presentation of FIG. 8 which is along the lines of FIG. 6, but which illustrates a condition in which wheel velocity $w_v$ falls to a value less than low wheel speed threshold established by the low speed detector 34. As can be seen in the drawing, the crossing of that threshold causes the output of the transistor Q1 to rise to the B+ level since it is no longer saturation limited by the saturation limiting circuit 32. As a result, the signal $e_a$ is pulled down by the falling wheel speed signal $w_v$ as illustrated in FIG. 7 to advantageously provide an extended skid detector "on" time thereby allowing the wheel to spin up to a greater degree. It is also advantageous to allow this extended spin up time when the skid condition is sufficiently severe so that the charge on capacitor 24 has exceeded the 50 millisecond charge threshold as determined by the comparator 50. Therefore, the above described provision is made for shunting the output of the saturation limiting circuit to ground when an output signal from the comparator 50 indicates that the charge on the capacitor 24 is above the 50 millisecond charge threshold.

In the preferred embodiment of the skid control system, the skid detector 18 and the saturation limiting feedback circuit 32 are utilized with other control units which perform additional control functions as set forth previously. The cooperation of those control functions with the skid detector 18 and the saturation limiting circuit 32 will now be made more apparent with reference to FIG. 9 which is a graphical illustration of an idealized series of skid control functions during the braking of a vehicle incorporating the skid control system 10 of this invention. With reference now to FIG. 9, the location 1 on the wheel speed trace $w_v$ the first deceleration threshold 1.5 g. has been reached and is continued to be exceeded through to location 2 at which time the wheel speed has fallen to an amount to bring $e_a$ down to a value which begins to turn off the transistor Q1 to draw the signal $e_{out}$ of the acceleration detector 18 to ½B+ as illustrated. During this period, the hold on capcitor 24 receives a charge from the charge circuit 38 so that the potential stored by the capacitor 24 increases as shown. At location 3 on the wheel speed trace, the wheel deceleration no longer exceeds the deceleration threshold of 1.5 g., and consequently, the output signal $e_{out}$ of the skid detector 18 returns to its low level as shown. As can be seen by the solenoid trace, the brakes have been relieved when the output $e_{out}$ of the skid detector 18 went to ½B+ and have been reapplied when the output $e_{out}$ of the skid detector 18 returns to its low level. Since the charge on the capacitor 24 is below the 50 millisecond charge level, the capacitor 24 is discharged through the fast discharge circuit 42. It should be noted from the trace that the wheel has recovered from a slight skid condition, and does not again reach the deceleration threshold of 1.5 g. until location 4 on the wheel speed trace. As illustrated, the wheel continues to decelerate above the threshold value for the preselected time. Consequently, the skid detector 18 again provides an output signal $e_{out}$ of ½B+ as shown at location 5 on the wheel speed trace $w_v$. Commencing at location 5, the hold-on capacitor 24 receives a charge from the charge circuit 38 so as to provide an increasing ramp voltage at the capacitor 24 as shown. As the wheel continues to decelerate above the threshold value of 1.5 g., the capacitor 24 continues to charge until it charges to a potential above the 50 millisecond charge threshold (indicated by a dashed horizontal line). At location 6 on the wheel speed trace $w_v$, the deceleration threshold of 1.5 g. is no longer exceeded, and therefore, the output signal $e_{out}$ of the skid detector 18 returns to its low level as indicated. However, the output signal to the solenoid remains so as to continue to relieve the brakes after the return of the output signal $e_{out}$ to the low level for the period during which the charge on the hold-on capacitor 24 exceeds the 50 millisecond threshold. This period is determined by the rate of discharge of the hold-on capacitor 24 through the slow discharge circuit 40. When the hold-on capacitor 24 reaches the 50 millisecond charge threshold, the solenoid voltage returns to its low level and the brakes are reapplied. Additionally, at that time, the capacitor 24 is discharged through the fast discharge circuit 42. It will be appreciated that the skid condition shown between locations 4 and 6 of the wheel speed trace is a more severe skid condition, and as a result, an additional period of brake relief was required to compensate for the skid condition.

Beginning at location 7 of the wheel speed trace, the deceleration threshold of 1.5 g. is again exceeded, and is apparent in view of the rapid fall in wheel speed thereafter that a serious skid condition has been encountered. At location 8, the threshold value has been exceeded for sufficient time to cause the skid detector 18 to provide an output signal $e_{out}$ of ½B+. Thereafter, the charge on the hold-on capacitor 24 exceeds the 50 millisecond charge threshold causing the output signal $e_{out}$ to return to the high level B+. At location 9, the wheel deceleration has increased to a second threshold value of 3.0 g. without operative effect. It should be noted that the wheel has continued to decelerate until location 10 at which point the wheel begins to turn around and accelerate to location 11. At location 11, the output signal $e_{out}$ of the skid detector 18 returns to its low level as described with respect to FIG. 6. Note that the output of the skid detector 18 has been maintained to a point beyond the reduction of the wheel deceleration to a value less than threshold value of 1.5 g., and in fact, until the wheel is actually accelerating.

With reference now to the trace of the charge on the hold-on capacitor 24, it should be noted that the 50 millisecond charge threshold had been exceeded and the charge on the capacitor had increased to a limiting level, and remained at that level until the output signal $e_{out}$ of the skid detector 18 had returned to its low level. After that time, the charge on the hold-on capacitor 24 slowly dissipates through the slow discharge circuit 40 until location 12 on the wheel speed trace at which point the skid recovery detector 20 responds to the acceleration of the wheel to provide its output signal which inhibits the output driver 28 so as to terminate the output signal to the solenoid. Upon generation of the skid recovery detector output signal, the fast discharge circuit 42 is actuated so that the hold-on capacitor 24 is rapidly discharged as shown for the duration of the signal from the skid recovery detector 20. When the charge on the hold-on capacitor 24 falls to the 50 millisecond charge threshold at location 13 on the wheel speed trace, the skid detector inhibit 30 provides an output signal as shown which prevents the generation of an output signal $e_{out}$ by the skid detector 18 for its duration. As a result, the momentary high deceleration at location 14 on the wheel speed trace is ineffective to cause brake relief. The wheel does not encounter the 1.5 g. threshold value again, and exceed that threshold for the requisite period, until location 15 on the wheel speed trace, at which time the skid detector 18 provides its output signal $e_{out}$ as shown, and a charge begins to accumulate on the hold-on capacitor 24. Shortly thereafter, at the location 16 on the wheel speed trace, the wheel speed has exceeded the second threshold value of 3.0 g., and consequently, the output signal $e_{out}$ of the skid detector 18 has increased to its higher value B+. At location 17, the wheel speed has fallen to the threshold value of the low speed detector 34, and as a result, the low speed detector provides an output signal as shown. The output of the low speed detector 34 is provided to the OR gate 54 and is effective to close the switch 58 to shunt the output of the saturation limiting feedback circuit 32 to ground thereby disabling the saturation limiting feedback circuit 32. As a result, the output of the skid detector 18 would go to B+ if it has been at the ½B+ level. In the particular case illustrated, the output of the skid detector is already at B+, and consequently, no change is effected. It will be noted from the wheel speed trace that the wheel has become completely locked at location 18 and does not recover from a completely locked condition until location 19. The wheel achieves the necessary acceleration level to provide a skid recovery detector output signal almost immediately after location 19 as shown, and therefore, the brakes are reapplied near location 19. The wheel speed $w_v$ finally again reaches the low wheel speed threshold at location 20, at which time the low speed detector output is removed. Note that the charge on the capacitor 24 has exceeded the 50 millisecond charge threshold and that the charge is slowly dissipated through the slow discharge circuit 40 once the skid recovery detector has provided its output signal. Upon removal of the skid detector output signal $e_{out}$, the capacitor 24 is discharged through the fast discharge circuit 42. The wheel then spins up to near synchronous and does not again exceed the skid detector deceleration threshold until 21, and does not subsequently enter a skid condition as determined by the skid detector 18 until location 22. At location 23, the wheel speed has fallen below the low wheel speed threshold thereby disabling the saturation limiting feedback circuit 32 to cause the output of the skid detector 18 to go to B+. The brakes are relieved at location 22 and, after experiencing wheel lock up between locations 24 and 25, skid recovery is sensed by the skid recovery detector 34 at location 26. Notice that the hold-on capacitor is discharged at the slow discharge rate for the period of time from the provision of a skid recovery detector output signal until such time that the skid detector signal is removed, and thereafter, at a high discharge rate. It will be noted that the wheel recovery occurs and that both the wheel speed and vehicle speed remain low until the vehicle finally stops at the right hand extremity of the graphical presentation of FIG. 8.

Figure 10:
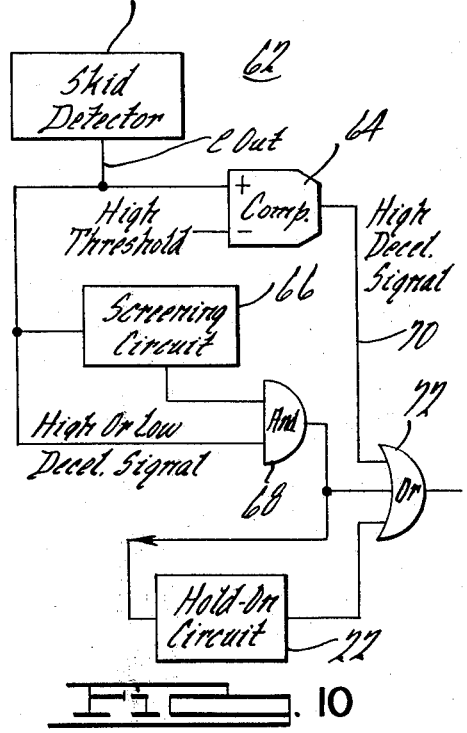
FIG. 10 is a block diagram of a modification of the circuit of FIG. 2.

In FIG. 10, a skid control system 62 is illustrated which includes a skid detector 18 and 32 which includes all of the components of the skid detector 18 and the saturation limiting feedback circuit 32 illustrated in FIG. 5. The skid detector 18 and 32 provides a signal $e_{out}$ as previously described which is received by a comparator 64, a screening circuit 66 and an AND gate 68. The comparator 64 provides a signal at its output on line 70 which indicates when the output signal $e_{out}$ of the skid detector 18 and 32 is equal to B+, i.e., that the output signal $e_{out}$ is at its higher level indicating a deceleration above 3.0 g. The screening circuit 66 provides an output whenever the output signal of the skid detector 18 and 32 has a duration exceeding 50 milliseconds so that an output is ordinarily not provided by the screening circuit on the first skid cycle. The output signal of the screening circuit 66 persists for 5 seconds after the output of the skid detector 18 and 32 is removed. The AND gate 68 receives the screening circuit output signal and provides an output signal whenever both the screening circuit and the skid detector 18 simultaneously provide output signals. The output of the AND gate 68 is received by hold-on circuit 22 and an OR gate 72. The OR gate 72 also receives the output of the hold-on circuit 27 and the high deceleration signal from the comparator 64 on line 70 so as to provide an output signal which is operative to relieve the brakes whenever any one of those three signals exists. The hold-on circuit 22 is as described with respect to FIG. 2 and provides an output signal generally whenever the duration of the skid detector output signal persists for a predetermined time period, as previously explained. Consequently, it will be appreciated that the brakes are relieved either if the hold-on circuit provides an output signal, indicating that a relatively long-duration skid condition is being encountered or a high level deceleration signal is provided indicating that a relatively severe skid condition is being experienced. The brakes are also relieved if the low level deceleration signal from the skid detector 18 and 32 is present after the first cycle as determined by the screening circuit 68. Consequently, only high deceleration signals are effective to cause release of the brakes on first cycle whereas low level deceleration signals are effected to release the brakes on subsequent cycles of a time-related series of skid control cycles. For example, a series of time-related cycles are illustrated in FIG. 9 since each subsequent cycle occurs within 5 seconds of the previous cycle.

Figure 11:
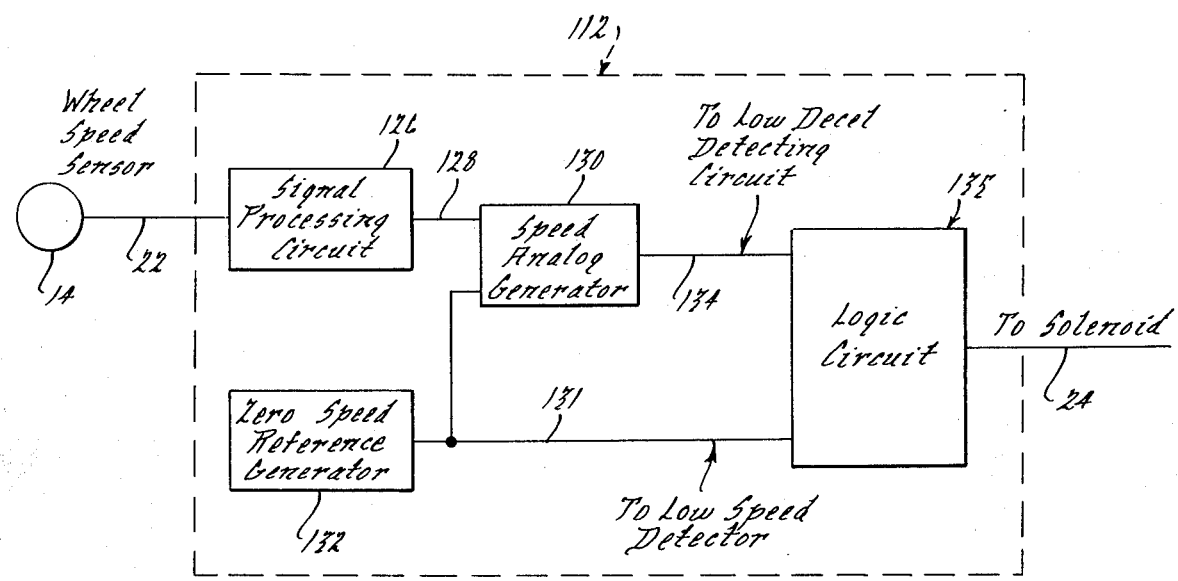
FIG. 11 is a general block diagram of a second exemplary embodiment of a skid control system according to the present invention.

In FIG. 11, a general block diagram of a second embodiment of a skid control module or computer 112 is illustrated. The skid control module 112 includes a signal processing unit 126 which receives the rear wheel speed signal on line 22 and converts the rear wheel speed signal into square wave current pulses of fixed duration and amplitude which appear on conductor 128. The current pulses on line 128 are integrated by a speed analog generator 130. The integrated current is converted into a voltage differential and is added to a reference voltage on line 131 from a voltage source representative of zero wheel speed from the zero speed reference generator 132. The speed analog generator provides an output signal on line 134 which is an analog voltage representative of the average rear wheel speed. The zero speed signal on line 131 and the wheel speed signal on line 134 are received by the logic circuit 135.

With reference to FIG. 12, in which a block diagram of the logic circuit 135 is illustrated, the wheel speed signal on line 134 is seen to be received by a low deceleration detecting circuit 136, a high deceleration detecting circuit 138 and other circuits to be described hereinafter. The low deceleration detecting circuit provides an output signal on line 140 when the wheel speed has exceeded a predetermined threshold, e.g., 1.5 g. The high deceleration detecting circuit 138 provides a signal on line 142 when the wheel deceleration has exceeded a higher wheel deceleration threshold, e.g., 4.0 g. The output signal of the low deceleration detecting circit 136 on line 140 is received by a buffer circuit 144 and a deceleration AND circuit 146. The output signal of the high deceleration detecting circuit 138 on line 142 also is received by the deceleration AND circuit 146. The deceleration AND circuit 146 provides an output signal on line 148 when both the low deceleration detecting circuit 136 and the high deceleration detecting circuit 138 simultaneously provide their output signals. The output signal of the deceleration AND circuit 146 on line 148 is provided to an output OR circuit 150. The buffer circuit 144 provides two in-phase or normal output signals and three out-of-phase or inverted output signals. One normal output signal is provided on line 152 to an inverting input of a threshold raiser and slip generator 154. A second normal output of the buffer circuit 144 is provided on line 156 to the inverting input of the hold-on reset circuit current source 158. An inverted output of the buffer circuit 144 on line 160 is provided to a discharge enable circuit 162, a second inverted output of the buffer circuit 144 on line 161 is provided to a two-level threshold circuit 164, and a third inverted output of the buffer circuit 144 on line 166 is provided to a charge inhibit circuit 168.

The control module 112 includes a hold-on capacitor 170 which accumulates a charge in accordance with the duration of various signals within the control module 112 and, at times, maintains the brakes in a relieved condition in accordance with its level of charge.

With regard to the charging and the discharging of the hold-on capacitor 170, the capacitor 170 is charged by increasing the potential across the plates of the capacitor 170 by adding electrons to one plate through the connection of that plate to a current sink, and the capacitor 170 is discharged by reducing the potential across the plates of the capacitor 170 by removing electrons from that one plate through the connection of that one plate to a current source. By virtue of the connection of the hold-on capacitor 170 in this particular circuit, the hold-on capacitor 170 is charged by connecting that one plate to a current sink, and is discharged by connecting that one plate to a current source. More specifically, the hold-on capacitor 170 may be charged by drawing current through line 178 into a hold-on charge circuit current sink 174. The charge rate may be doubled by additionally drawing current through line 172 and a current pass/block circuit 176 into the hold-on charge circuit current sink 174. The hold-on capacitor may be discharged by receiving current from the hold-on discharge circuit current source 182 through line 186. The discharge rate may be doubled by additionally receiving current from the hold-on discharge circuit current source 182 through line 180 and a current pass/diverter circuit 184. The hold-on capacitor 170 may be very rapidly discharged through receiving a large current through conductor 188 from the hold-on reset circuit 158. The hold-on capacitor 170 provides an output signal representative of its level of charge on output line 190 to a hold-on voltage comparison circuit 192. The hold-on voltage comparison circuit 192 receives one of two reference signal levels for comparison with the charge level on the hold-on capacitor 170 as received on line 194 from the two-level threshold circuit 164. The hold-on voltage comparison circuit 192 provides one output signal on line 196 to the second input of the output OR circuit 150, and a second output signal on line 198 to the other inverting input of the hold-on reset circuit 158. The output OR circuit 150 provides an output signal on line 200 to an output AND circuit 202 which in turn provides the output signal of the skid control module 112 on line 24. The average rear wheel speed voltage analog signal on line 134 is also received by an analog acceleration amplifier 204 which differentiates the wheel speed signal and adds the differentiated signal to a reference signal on line 206 to provide a signal on line 208 which represents the amount that the wheel acceleration exceeds the reference acceleration represented by the signal on line 206. The wheel acceleration signal on line 208 is received by a low acceleration detecting circuit 210 which provides a normal output signal on line 212 and an inverted signal on line 214 when the wheel acceleration exceeds a level of 1.5 g. The output signal on line 212 is received at one input of the discharge enable circuit 162 while the inverted output signal on line 214 is received at a second inverted input of the threshold raiser and slip generator 154. The wheel acceleration voltage signal on line 208 is also received by a high acceleration detecting circuit 216 which provides a normal output signal on line 218 and an inverted output signal on line 220 when the wheel acceleration exceeds a higher threshold, e.g., 4.5 g. The output signal on line 218 is received at an inverting input of the output AND circuit 202 while the inverted signal on line 220 is received at the current pass/diverter circuit 184. An acceleraton reference and threshold generator 222 provides the acceleration reference signal to the low acceleration detecting circuit 210 on line 206 and provides a different signal representative of a higher threshold on line 224 to the high acceleration detecting circuit 216.

A low speed detector 230 receives the average wheel speed voltage analog signal on line 134 at one input and the signal on line 130 representing the zero speed reference at its other input. The low speed detector 230 provides two inverted or out-of-phase outputs on lines 232 and 234. Accordingly, when the wheel speed is above the low speed threshold, e.g., 4 miles an hour, the signals on lines 232 and 234 are high, while when the wheel speed falls below the low speed threshold, the signals on lines 232 and 234 are low. The signal on line 232 is received by the current pass/block circuit 176 while the signal on line 234 is received by the other input of the two-level threshold circuit 164.

A proportional reference current generator 226 receives the wheel acceleration voltage signal on line 208 and provides a current on line 228 representative of the wheel acceleration to the hold-on discharge circuit current source 182.

The hold-on discharge circuit current source 182 also receives a reference current on line 236 from a fixed reference current generator 238.

A timed-out threshold raiser 240 receives the regulated power supply on line 252 and provides an output signal on line 244 which is effective to raise the threshold of the low deceleration detecting circuit 136 for a short period of time subsequent to the initial powering of the module which occurs upon closing of the ignition switch. The raising of the threshold of the low deceleration detecting circuit 136 during this period minimizes the duration of the modulating brake pressure valve cycle which is caused by transients resulting from the initial charging of the storage elements with the module when the ignition switch is closed thereby minimizing the time period that the brakes are relieved. The period of brake release is shortened since the transient occurring on powering of the module will exceed the higher deceleration threshold for a shorter period of time than it would have exceeded the normal lower threshold.

With reference now to FIG. 13, a constant current source 250 of known construction has a plurality of output lines for providing a current on each of the constant magnitude to the various circuit portions of the logic circuit 112 as illustrated.

As previously described, the wheel speed signal on line 134 is received by the low deceleration detecting circuit 136. The low deceleration detecting circuit 136 includes a differentiating capacitor C1, a desensitizing resistor R1, a biasing resistor R2, and a transistor Q1. The transistor Q1 is normally held on by the base current which flows through resistor R2 from a regulated voltage B+ on line 252. Upon a wheel deceleration of a given magnitude, the signal at the input of the low deceleration detecting circuit 136 falls at a sufficiently rapid rate so as to divert current from the base of the transistor Q1 into the capacitor C1 through the resistor R1 to turn the transistor Q1 off. Accordingly, the output signal of the low deceleration detecting circuit 136 on line 140 is normally in a low state but reverts to a high state when the low deceleration threshold is exceeded. The level at which transistor Q1 is turned off, e.g., 1.5 g, is established by the level of current through the resistor R2 which in turn is established by the magnitude of the voltage B+ and the resistance of the resistor R2. This threshold level at which transistor Q1 turns off may be varied through the supply of supplemental current to the base of the transistor Q1 from lines 254 and 256. The resistor R1 desensitizes the low deceleration detecting circuit to high wheel decelerations of very limited duration which are not indicative of a true incipient skid condition so as to avoid false responses to these high wheel decelerations.

The high deceleration detecting circuit 138 also receives the wheel speed signal on line 134. The high deceleration detecting circuit 138 includes an input resistor R3, a differentiating capacitor C2, a baising resistor R4 and an output transistor Q2. The high deceleration detecting circuit 138 operates in essentially the same manner as the low deceleration detecting circuit 136, and for that reason, a detailed description of its operation will not be given. Note, however, that a desensitizing resistor between the capacitor C2 and the transistor Q2 and means for altering the threshold are not provided. The desensitizing resistor is not needed since the high deceleration detecting circuit 138 functions only in conjunction with the low deceleration detecting circuit 136 by virtue of their connection to the deceleration AND circuit 146 so that high wheel decelerations of short duration will not affect the output of the deceleration AND circuit 146.

The deceleration AND circuit 146 includes emitter-follower transistors Q3 and Q4 having their base connected to receive the signals on lines 140 and 142 from the low deceleration detecting circuit 136 and the high deceleration detecting circuit 138, respectively. When the wheel deceleration has exceeded both the low deceleration threshold and the high deceleration threshold, the emitter-follower transistors Q3 and Q4 follow the high state of the output of the deceleration detecting circuits 136 and 138 to bias transistor Q5 on. If only one deceleration detecting circuit 136 or 138 is in a high state, the emitter-follower transistor Q3 or Q4 associated with the other deceleration detecting circuit 136 or 138 will hold the base of the transistor Q5 low to prevent the transistor Q5 from turning on. Accordingly, the transistor Q5 turns on to pull up the output signal on line 148 only when both wheel deceleration thresholds are exceeded.

The buffer circuit 144 receives the output signal on line 140 from the low deceleration detecting circuit 136 at transistor Q6. Transistor Q6 is coupled to transistor Q7 and a multiple collector transistor Q8 so that when the low deceleration detecting circuit 136 provides its output signal on line 140, transistors Q6, Q7 and Q8 turn on so that an output signal in a high potential state is provided at the collectors of transistor Q8 which appears on lines 152 and 156. At the same time, the collectors of transistors Q7, Q9 and Q10, initially in a high state, go low to provide an out-of-phase or inverted signal on lines 160, 161 and 166, respectively. Accordingly, the buffer circuit 144 provides two normal outputs on lines 152 and 156 and three inverted or out-of-phase outputs on lines 160, 161 and 166.

With reference to FIG. 14, the charge inhibit circuit 168 includes a transistor Q11 which is normally held on by the inverted output on line 166 so that its output signal is normally low and is brought to a high state when the signal on line 166 goes low when the wheel deceleration exceeds the low threshold level to turn off transistor Q11.

The hold-on charge circuit 174 includes a transistor Q13 having its base connected to receive the output signal from the charge inhibit circuit 168 so that when the charge inhibit circuit output signal goes high upon the attainment of the low threshold, the transistor Q13 and associated transistor Q12 turn on to a degree in accordance with the current made available by resistor R5 thereby turning on transistors Q14 and Q15. Accordingly, the current provided by transistors Q14 and Q15 are regulated at a level established by the resistance of the resistor R5 whereby the hold-on charge circuit 174 provides two regulated output currents, with one being provided to the current pass/block circuit 176 and the other being provided to the conductor 178. As previously mentioned, the conductor 178 is directly connected to the hold-on capacitor 170 for charging the capacitor 170, while the current pass/block circuit 176 is interposed between the hold-on charge circuit 174 and the hold-on capacitor 170. The current pass/block circuit 176 may be allowed to pass current from the hold-on capacitor 170 into the hold-on charge circuit 174 in response to a signal on line 232. As will be explained hereinafter, the low speed detector 230 provides a signal on line 232 whenever the wheel speed is above a predetermined wheel speed, e.g. 4 miles per hour, which effectively blocks the path for current from the hold-on capacitor 170 through the current pass/block circuit 176, and removes the signal on line 232 when the wheel speed is below the predetermined amount to allow current to pass from the hold-on capacitor 170 through the current pass/block circuit 176 into the hold-on charge circuit 174 so as to double the rate of charge current drawn from the hold-on capacitor 170 thereby doubling the rate at which the hold-on capacitor 170 is charged.

Figure 15:
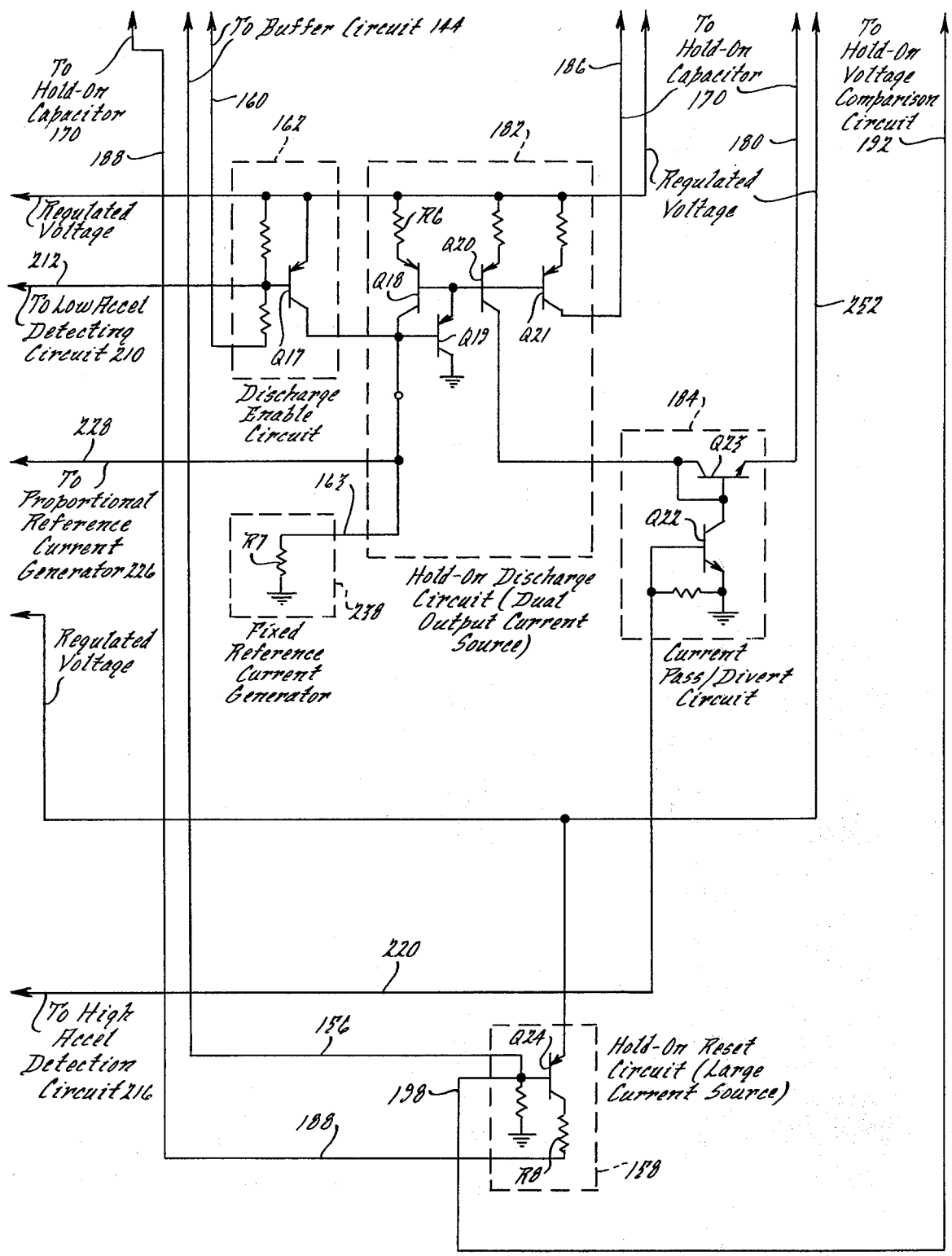
FIG. 15 is a third portion of a schematic diagram of the skid control system of FIGS. 11 and 12.

With reference now to FIG. 15, the discharge enable circuit 162 has a transistor Q17 which receives, at its base, the signal on line 160 from the buffer circuit 144 and the signal on line 212 from the low acceleration detecting circuit 210. The transistor Q17 is normally off to provide a normally low output signal to the hold-on discharge circuit 182 resulting in the provision of discharge currents from the outputs of the hold-on discharge circuit 182. The transistor Q17 may be turned on to disable the hold-on discharge circuit 182, thereby terminating the discharge currents, when the signal on line 160 from the buffer circuit 144 goes low indicating that the low deceleration detecting circuit 136 is on. Normally, the transistor Q17 of the discharge enable circuit 162 will turn off when the signal on line 160 from the buffer circuit 144 again goes high indicating the termination of the output signal from the low deceleration detecting circuit 136. However, the signal from the buffer circuit 144 on line 160 can be overridden by a high signal on line 212 from the low acceleration detecting circuit 210 indicating that the wheel has exceeded the low acceleration threshold. This high signal on line 212 is effective to turn off the transistor Q17 to again permit the provision of discharge currents from the two outputs of the hold-on discharge circuit 182. It should be noted that the signal on line 212 from the low acceleration detecting circuit 210 is effective to turn off the transistor Q17 when it goes high to clamp the base emitter of the transistor Q17, but is not effective to turn on the transistor Q17 at other times.

The hold-on discharge circuit 182 includes a transistor Q18 whose collector receives the output signal on line 163 from the discharge enable circuit 162 which is normally conductive when the transistor Q17 is non-conductive, i.e., there is no output signal from the discharge enable circuit 162. When transistor Q18 is conductive, current flows from the regulated voltage line 252 through the resistor R6, the transistor Q18, and the resistor R7 of the fixed reference current generator 238. The resistance of resistor R7 is selected to establish a predetermined minimum level of current through the transistor Q18 which operates in conjunction with transistors Q19, Q20 and Q21 to establish the minimum level of controlled current from the hold-on discharge circuit 182 on conductor 186. The resistor R7, operating in conjunction with transistors Q19 and Q20, establish the minimum level of an additional controlled current output which is received by the current pass/divert circuit 184 from the transistor Q20.

With reference now additionally to FIG. 16, the minimum level of current is supplemented by a wheel acceleration related current established by the proportional reference current generator 226. The proportional reference current generator 226 has a resistor R18 which is connected in series between the output line 208 of the analog acceleration amplifier 204, which line carries a voltage which is inversely related to the wheel acceleration and the base of transistor Q19. Accordingly, the collector-emitter current of the transistor Q18 is varied in direct accordance with wheel acceleration thereby varying the drain through transistor Q18 in direct accordance with the wheel acceleration. As previously stated, the fixed reference current generator 238 has a resistor R7 which is connected to ground to establish a minimum level of emitter-collector current drain from the transistor Q18. The net result of the effects of the proportional reference current generator 226 and the fixed reference current generator 238 is that the controlled currents at the outputs of the hold-on discharge circuit 182 will generally represent wheel acceleration and will never fall below a minimum level established by the value of resistor R7 of the fixed reference current generator 238. Note that the hold-on discharge circuit 182 has two constant current outputs, one on line 180 and the other received by the current pass/divert circuit 184, for discharging the hold-on capacitor 170.

The current pass/divert circuit 184 has a transistor Q22 which receives the inverted output signal on line 220 from the high acceleration detecting circuit 210 and serves as an inverter for the inverted signal to provide an "inverted, inverted" or normal signal to the base of a transistor Q23 of the current pass/divert circuit 184. Accordingly, since the signal on line 220 is low when the wheel has exceeded the high acceleration threshold, the base of the transistor Q23 receives a high signal when the wheel has exceeded the high acceleration threshold. That high signal turns on transistor Q23 to provide the second path for current from the hold-on discharge circuit 182 to the hold-on capacitor 170 to contribute to the discharge of the hold-on capacitor 170.

With reference now to the hold-on capacitor 170 it should be noted that the upper plate is connected to the regulated voltage line 252 while the lower plate is connected to the various charge and discharge circuits so that the hold-on capacitor 170 is effectively charged, i.e., the voltage across the plates thereof is increased by adding electrons to the lower plate by connecting the lower plate to a current sink. Additionally, the hold-on capacitor 170 is effectively discharged by connecting the lower plate of the hold-on capacitor 170 to a current source which decreases the potential across the hold-on capacitor 170 by removing electrons from the lower plate.

The hold-on capacitor 170 can be rapidly discharged by the hold-on reset circuit 158 which provides a large current on conductor 188 from a transistor Q24 in response to a low signal at the base of transistor Q24 from both the buffer circuit 144 on line 156, indicating that the low deceleration detecting circuit is off, and the hold-on capacitor voltage comparison circuit output on line 198, indicating that the charge on the hold-on capacitor is below the reference level. It can be seen that the emitter of transistor Q24 is connected to the regulated voltage line 252 so that when it conducts the hold-on capacitor 170 is connected to the regulating voltage line 252 through the transistor Q24 and a resistor R8.

The hold-on capacitor charge level appears on line 190 which is connected to the base of a transistor Q25 of the hold-on capacitor voltage comparison circuit 192. The reference potential from the two-level threshold circuit 164 on line 194 is connected to the base of transistor Q26. The hold-on capacitor potential at the base of transistor Q25 is compared to the reference potential at the base of a transistor Q26. When the hold-on capacitor voltage on line 90 is greater than the reference voltage on line 194, i.e., the hold-on capacitor charge level does not exceed the threshold, transistor Q25 is turned on to turn on transistor Q27 due to the voltage drop across resistor R10 to clamp transistors Q26 and Q28 off. When the hold-on voltage on line 190 is less than the reference voltage on line 194, i.e., the hold-on capacitor charge level has exceeded the threshold, transistor Q26 is turned on to turn on transistor Q28 due to the voltage drop across resistor R9 and also to clamp transistors Q25 and Q27 off. When transistor Q28 is on, indicating that the threshold then in effect has been exceeded, the potential on output lines 196 and 198 of the hold-on capacitor voltage comparison circuit 192 are high. When the threshold then in effect has not been exceeded, transistor Q28 is off so that the output of the hold-on capacitor voltage comparison circuit 192 on lines 196 and 198 are low.

The output OR circuit 150 receives one input signal on line 148 at the base of transistor Q29 from the deceleration AND circuit 146 and another input signal on line 196 at the base of transistor Q30 from the hold-on voltage comparison circuit 192. When the signal on line 148 is high indicating that the wheel has exceeded both the deceleration thresholds, the transistor Q29 will turn on to turn off the transistor Q32 resulting in a high output signal from the collector of transistor Q32 on output OR circuit output line 200. Additionally, a high output signal on output line 196 from the hold-on capacitor voltage comparison circuit 192 indicating that the hold-on capacitor voltage is below the reference voltage, i.e., has exceeded the threshold, will turn on transistor Q30 to turn off transistor Q32 thereby providing an output signal on output line 200 of the output OR circuit 150.

In view of the above it will be appreciated that the output OR circuit 150 provides a high output signal on line 200 when both of the deceleration thresholds have been exceeded or the hold-on capacitor charge exceeds the threshold which is in effect at that time as established by the two-level threshold circuit 164.

The output signal on line 200 from the output OR circuit 150 is provided to one input terminal of an output AND circuit 202 which in turn provides an output signal on line 24 to the solenoid of the brake pressure modulator (via a driver circuit, not shown). The output AND circuit 202 also receives a signal on line 218 from the high acceleration detecting circuit 216 when the wheel exceeds the high acceleration threshold. The signal on line 218 is in effect inverted by transistor Q33 within the output AND circuit 202. A transistor Q34 receives the output signal on line 200 from the output OR circuit 150 at its base and its collector so as to be turned on by the output signal on line 200. However, if transistor Q33 receives a signal on line 218 indicating that the high wheel acceleration threshold has been exceeded, transistor Q33 conducts to clamp transistor Q34 off. Accordingly, transistor Q34, absent the high wheel acceleration signal on line 218, conducts when the signal is received from the output OR circuit on line 200 to provide a high signal on line 24, and does not conduct either when the signal on line 200 is absent or when the transistor Q33 receives the high wheel acceleration signal on line 218.

With reference to FIG. 16, the wheel speed signal on line 134 is also received at the input of the analog acceleration amplifier 204. This wheel speed signal is differentiated by a differentiating capacitor C3 to provide a current representative of wheel acceleration. A portion of this current is drawn to ground through resistor R11 to cause the output signal to be slightly higher than it would be without the current drain through resistor R11 for purposes to be set forth hereinafter. The analog acceleration amplifier 204 basically operates as a conventional differentiating operational amplifier with the base of transistor Q35 being the positive input and the base of transistor Q36 being the negative input. The analog acceleration amplifier 204 receives a reference signal at the base of transistor Q35 from line 206 and provides an output signal on line 208 from the collector of transistor Q44 which is a voltage inversely related to the level of wheel acceleration as modified by the resistor R11. Transistors Q37, Q38, Q39 and Q40 additionally form part of the voltage comparator and amplification circuit. Transistors Q41 and Q42 are current regulators while transistors Q43 and Q44 are current amplifiers. Since transistors Q37–Q44 do not form a part of this invention, and they operate in a well known manner, a detailed description of the operation thereof will not be presented here.

Transistor Q45 is connected to the base of transistor Q36 to clamp the base to collector junction during high wheel decelerations to prevent saturation of the analog acceleration amplifier 204 during the high wheel decelerations. Note that during wheel decelerations of appropriate magnitude, the base of transistor Q45 is biased above the emitter thereof to turn transistor Q45 on to clamp the transistor Q36, but during wheel acceleration the base of transistor Q45 is biased below the emitter thereof so that transistor Q45 is turned off and performs no control function relative to transistor Q36. If the base of transistor Q36 were not clamped during high wheel decelerations, transistor Q36 would become sufficiently saturated during the high wheel deceleration so as to prevent its recovery in time to appropriately respond to the wheel acceleration. Due to the clamping of the base of the transistor Q36, the transistor Q36 is capable of responding to the acceleration of the wheel immediately upon the initiation of wheel acceleration.

The voltage on line 208 which inversely represents wheel acceleration is delivered to the low acceleration detecting circuit 210. The low acceleration detecting circuit 210 has a first transistor Q46 which receives the voltage representative of wheel acceleration at its base and a transistor Q47 which receives the reference voltage from line 206 from the reference and threshold generator 222 at its base. When the reference signal at the base of transistor Q47 is greater than the acceleration signal at the base of transistor Q46, transistor Q47 is turned on to turn on the output transistor Q48 due to the voltage drop across resistor R12. If the potential at the base of transistor Q46 is greater than the reference potential at the base of transistor Q47, the transistor Q46 is turned on to turn on transistor Q49. Since the potential at the base of transistor Q46 is ordinarily slightly higher than the reference potential at the base of transistor Q47 by virtue of the current drain of the resistor R11 in the analog acceleration amplifier 204, the transistor Q49 is normally on. Upon a wheel acceleration which reduces the potential at the base of transistor Q46 below the level of the reference potential on the base of transistor Q47, the transistor Q49 is turned off and the transistor Q48 is turned on. Note that the amount that the potential at the base of transistor Q46 normally exceeds the potential at the base of transistor Q47 which is due to the current drain through resistor R11 constitutes an acceleration threshold which must be exceeded to provide an output signal. Hence, the value of resistance of resistor R11 establishes the low acceleration threshold. The low acceleration detecting circuit provides a normal or in-phase output signal on line 212 when the collector of transistor Q48 goes from low to high in response to a wheel acceleration exceeding the low acceleration threshold, and an inverted or out-of-phase signal on line 214 when the collector of transistor Q49 goes from high to low when the wheel acceleration exceeds the low acceleration threshold.

The high-wheel acceleration detector 216 receives the voltage on line 208 which is inversely linearly related to wheel acceleration at the base of transistor Q50 and a signal on line 224 representative of the upper acceleration threshold at the base of transistor Q51. When the voltage on line 208 which inversely represents wheel acceleration is greater than the reference voltage on line 224 indicating that the upper wheel acceleration threshold has not exceeded, the transistor Q50 is on, which turns on transistor Q52 by virtue of the voltage drop across resistor R14 to provide an output signal on output line 220 which is in a high state. When the upper acceleration threshold is exceeded, the reference voltage on line 224 becomes greater than the wheel acceleration voltage on line 208 to turn on transistor Q51 which in turn turns on transistor Q53 due to the voltage drop across resistor R15 to bring the potential on output line 218 from a low to a high state. It should be noted that when the transistor Q50 is turned on, the transistors Q51 and Q53 are turned off since transistor Q50 raises the emitter potential of transistor Q51 above the potential needed for base-emitter conduction of transistor Q51. Conversely, when transistor Q51 is turned on, the transistor Q50 is turned off by the same means.

The acceleration reference and threshold generator 222, as previously stated, provides a reference level on line 206 to the low acceleration detecting circuit 210 and a reference potential on line 224 to the high acceleration detecting circuit 216. The acceleration reference and threshold generator 222 includes transistors Q54 and Q55 which convert the regulated voltage on line 252 to a constant or regulated current and voltage which is provided to the voltage divider network consisting of resistors R16 and R17. The line 206 is connected to the upper end of the voltage divider network while the line 224 is connected intermediate the resistors R16 and R17. Consequently, line 206 receives a high voltage which provides the lower acceleration threshold in conjunction with resistor R11 as explained while line 224 receives a lower voltage which is representative of the higher threshold. It will be appreciated that the inverse relationship between the voltages on line 206 and line 224 relative to the threshold levels is due to the fact that the output voltage on line 208 is inversely representative of wheel acceleration.

The low speed detector 230 also receives the tachometer output signal on line 134 which is representative of wheel speed. The low speed detector 230 further receives a reference voltage on line 130. The wheel speed voltage on line 134 is connected to a voltage divider having resistors R19 and R20 to yield a voltage at the intermediate junction of the voltage divider which is a predetermined percentage or fraction of the wheel voltage. This voltage is connected to the base of a transistor Q54 for comparison to the zero speed reference voltage which is received at the base of a transistor Q55. When the fraction of the wheel speed voltage selected by the voltage divider R19, R20 is greater than the zero speed reference voltage, the transistor Q55 is turned on and the transistor Q54 is clamped off by a transistor Q56. When a transistor Q54 is turned off, transistor Q57 is also turned off. A transistor Q58 has its base connected to the current supply 250 so that transistor Q58 is on whenever transistor Q57 is off. The transistor Q58, when conducting, holds on transistor Q59 by virtue of the voltage drop across resistor R21 so that the output signal from the collector transistor Q59 on lines 232 and 234 are in a high voltage condition, i.e., when the fraction of the wheel speed voltage selected by the voltage divider R19, R20 is greater than the zero speed reference voltage. When the wheel speed falls to a sufficiently low level such that its fraction at the voltage divider R19 and R20 is less than the zero speed reference at the base of transistor Q55, transistors Q55 and Q56 turn off and transistor Q54 turns on. When transistor Q54 turns on, transistor Q57 is turned on to clamp transistor Q58 off thereby causing the base of transistor Q59 to be pulled up toward the regulated voltage on line 252 to turn transistor Q59 off. Consequently, the output signal at the collector transistor Q59 on lines 232 and 234 will go low, i.e., when the wheel speed falls below the preselected level established by the voltage divider R19, R20 and the zero speed reference. For example, this preselected level may be adjusted to represent 4 miles per hour.

As previously indicated, the output signal on line 232 is connected to the emitter of transistor Q16 of the current pass/block circuit 176 so that while the signal on line 232 is at a high voltage level, the transistor Q16 is back-biased to prevent any current drain from the hold-on capacitor 170 of the hold-on charge circuit 174. When the signal on line 232 goes low indicating the wheel speed has fallen below the preselected level, the transistor Q16 of the current pass/block circuit 176 is no longer back-biased allowing current to be drained from the hold-on capacitor 170 to the hold-on charge current sink 174 to double the charge rate of the hold-on capacitor 170.

The output signal on line 234 is provided to the two-level threshold circuit 164. The two-level threshold circuit 164 has a transistor Q60 which receives the signal on line 234 and the signal on line 161 at its base so that transistor Q60 is turned on when both signals are high and is turned off when either signal is low. When the transistor Q60 is turned off, the signal on its output line 194 is high. As previously explained, the signal on line 161 is low whenever the wheel exceeds the lower wheel deceleration threshold as indicated by the switching of the low deceleration detecting circuit 136 and the signal on line 234 is low when the wheel speed is below the low speed threshold. Accordingly, the output signal on line 194 from the two-level threshold circuit is high whenever the low deceleration detecting circuit is on or the wheel speed is below the low wheel speed threshold. Conversely, the output signal on line 194 is low when the low deceleration detecting circuit is not on and the wheel speed is above the low wheel speed threshold.

It should be noted at this time that a high output on the output line of the two-level threshold circuit 194 represents a low level of charge on the hold-on capacitor 170 and a low output on the output line 194 of the two-level threshold circuit 164 represents a higher level of charge on the hold-on capacitor 170. As previously explained, the signal on line 194 provides the reference voltage against which the hold-on capacitor voltage on line 190 is compared by the hold-on capacitor voltage comparison circuit 192.

The threshold raiser and slip generator 154 has a transistor Q61 which receives at its base the normal signal on line 152 from the buffer circuit 144 and the inverted signal on line 214 from the low acceleration detecting circuit 210. The transistor Q61 provides an output current on line 254 to the low deceleration detecting circuit 136 when both the signal on line 152 and the signal on line 214 are low. The current from the transistor Q61 provides supplemental current flow into the base of transistor Q1 of the low deceleration detecting circuit 136 through the line 254. This supplemental current effectively raises the low deceleration threshold since additional current must be drawn into the capacitor C1 before sufficient current is diverted from the base of transistor Q1 to turn transistor Q1 off. As previously indicated, the signal on line 152 is low when the low deceleration detecting circuit 136 is off and the signal on line 214 is low when the low acceleration detecting circuit is on thereby providing its inverse output signal on line 214. Accordingly, the threshold of the low deceleration detecting circuit 136 is increased by the threshold raiser and the slip generator 154 when the wheel is not exceeding the low deceleration threshold but is exceeding the low acceleration threshold.

The timed-out threshold raiser 240 receives the regulated power supply from line 252 at the emitter of transistor Q63. Upon initial powering of the module 112, current is provided from the regulated voltage line 252 through the resistors R22, R23 and R24 to charge the capacitor C4. During this initial current surge, the transistor Q63 is forward biased by virtue of the voltage drop across resistor R22 to provide an output current on line 256. A transistor Q64 is also forward biased by virtue of the voltage drop across resistor R24 to divert some of the current from resistors R22 and R23 to ground. Transistor Q62, however, is back biased by virtue of the reverse voltage drop across resistors R22–R24 relative to its base emitter junction. Once the capacitor C4 charges to near the regulated voltage on line 252, the transistor Q64 turns off, and shortly thereafter, the transistor Q63 turns off thereby terminating the output current on line 256. When power is removed from the module, the capacitor C4 is discharged through the now forward biased transistor Q62 to ground, thereby resetting the timed-out threshold raiser to prepare it for the next time that the module 12 is powered.

With reference now to FIG. 17, a typical skid controlled stop is illustrated for a vehicle having a skid control system 110 according to the present invention. Note that during the stop, the vehicle traverses a surface which has a coefficient of friction varying from a high value to a medium value to a low value, and back again to a high value.

Looking to the trace of the wheel speed and the vehicle speed in FIG. 17, the brakes are seen to be applied at time 1 which results in a wheel deceleration at time 2 which exceeds the low deceleration threshold thereby causing the low deceleration detecting circuit 136 to provide its output signal as illustrated. Accordingly, at time 2, the hold-on capacitor begins to be charged through line 178 from the hold-on charge circuit 174 under the control of the buffer circuit 144. At this same time, the reference level provided through the hold-on voltage comparison circuit 192 is switched to the higher level as illustrated. At time 3, the wheel deceleration has exceeded the high deceleration threshold resulting in a signal on line 148 to the output OR circuit 150, a signal on line 200 to the output AND circuit 202 which in turn results in an output signal to the brake pressure modulating valve solenoid since the high wheel acceleration threshold is not being exceeded, resulting in release of the brakes at time 3.

With reference to the brake pressure trace, it can be seen that the brake pressure begins to fall relatively rapidly. At time 4, the hold-on capacitor 170 has been charged to the level of the upper reference voltage thereby resulting in an output signal from the hold-on capacitor voltage comparison circuit as illustrated. Beyond time 4, the hold-on capacitor 170 continues to charge so that its potential continues to fall below the higher reference level. At time 5, the brake pressure has been relieved to a sufficient degree so that the wheel begins its recovery and experiences zero acceleration/deceleration. Shortly thereafter, at time 6, the wheel exceeds the low acceleration threshold resulting in an output signal from the low acceleration detecting circuit 210. The output signal from the low acceleration detecting circuit 210 is received by the discharge enable circuit to enable the discharge of the hold-on capacitor 170. Since the hold-on capacitor 170 is being simultaneously charged and discharged after time 6, the charge level remains relatively constant. At time 7, the wheel has exceeded the high wheel acceleration threshold resulting in an output signal on line 218 from the high acceleration detecting circuit 216. The output signal on line 218 from the high acceleration detecting circuit 216 inhibits the output signal from the output OR circuit 150 at the output AND circuit 202 to result in the de-energization of the solenoid and a consequent rise in the brake pressure under control of the brake pressure modulator as illustrated. The high acceleration detecting circuit 216 also provides a low output signal on line 220 which permits the capacitor to be discharged through the current pass-divert circuit 184 as well as through line 180. As previously explained, the discharge of the capacitor through both the line 180 and the current pass/divert circuit 184 is in accordance with the wheel acceleration under the control of the proportional reference current generator 226.

At time 8, the low deceleration detecting circuit 136 turns off, i.e., the transistor Q1 again becomes conductive, to result in the switching of the two-level threshold to the lower level under the control of the output signal from the buffer circuit 144 on line 162. By virtue of the switching of the reference level from the higher level to the lower level, with the lower level representing higher capacitor charge and the higher level representing a lower capacitor charge, the charge on the capacitor no longer exceeds the reference level resulting in the termination of the output signal from the hold-on capacitor voltage comparison circuit 192. Such termination results in the activation of the hold-on reset circuit which provides a large current to discharge the capacitor to the residual or zero level.

The termination of the low deceleration detecting circuit output signal at time 8 results in an output signal from the threshold raiser and slip generator 154 on line 254 since the low acceleration detecting circuit is concurrently providing an output signal on line 214. The output signal of the threshold raiser and slip generator 154 persists until time 9 when the wheel speed has completely recovered, and consequently, the low acceleration detecting circuit 210 turns off. It should be noted that just prior to time 9, the high acceleration detecting circuit 216 has turned off.

At time 10, the wheel experiences a high deceleration by virtue of the overshoot oscillation which at times occurs on surfaces having high coefficients of friction. This high wheel deceleration at time 10 would ordinarily be sufficient to cause the low deceleration detecting circuit 136 to provide its output signal. However, the additional current supplied on line 254 to the base of transistor Q1 desensitizes the low deceleration detecting circuit 136. Even though the output signal from the threshold raiser and slip generator 154 has terminated by time 9, the additional current provided to the low deceleration detecting circuit 136 dissipates in a transient-type manner to cause the desensitizing effect to persist beyond time 10. By time 11, the oscillation of the wheel triggers the low acceleration detecting circuit and shortly thereafter, the high acceleration detecting circuit. The output signal from the low acceleration detecting circuit on line 214, in the absence of an output signal from the low deceleration detecting circuit 136, again results in an output signal on line 254 from the threshold raiser and slip generator 154 which desensitizes the low deceleration detecting circuit 136 as previously described. At time 12 the threshold raiser and slip generator 154 turns off with the turning off of the low deceleration detecting circuit 210, yet the transient nature of the current into the base of the transistor Q1 maintains the desensitizing effect during time 13 at which time the wheel again, by virtue of the overshoot oscillations, experiences a wheel deceleration in excess of the low deceleration threshold. This deceleration is again ineffective to cause release of the brakes for the reasons described above. The aforedescribed cycle again occurs between times 14 and 15.

During the entire period from time 7, the brake pressure has been increasing at a rate established by the brake pressure modulator. At time 16, the brake pressure has increased to a sufficient extent that it is now too high for the medium mu surface on which the vehicle is operating so as to again cause the wheel to decelerate in excess of the low deceleration threshold resulting in an output signal from the low deceleration detecting circuit 136. As previously described, at time 16, the hold-on capacitor threshold switches to the higher level and the hold-on capacitor 170 begins to charge. The brakes are not released until time 17 when the charge level of the hold-on capacitor 170 has reached the upper threshold level, as set by the two-level threshold circuit 164, resulting in an output signal on line 196 to the output OR circuit 150 and an output signal on line 100 to the output AND circuit 202. The output AND circuit 202 provides the brake release output signal since the high wheel acceleration detecting circuit 216 is off. Shortly thereafter, at time 18, the wheel exceeds the high deceleration threshold. Since the brakes have already been relieved, that occurrence has no operative effect.

At time 19, the wheel has reached the level of zero acceleration/deceleration. Shortly thereafter, at time 20, the wheel acceleration has attained the low acceleration threshold which results in an output signal from the low acceleration detecting circuit 210 on line 212. This output signal is provided to the discharge enable circuit 162 which causes the hold-on discharge circuit to provide current on line 180 to the hold-on capacitor 170. The net result is still a charging action of the hold-on capacitor 170; however, at a reduced rate due to the current flow from line 180 which to some extent offsets the current drain into line 178. At time 21, the high wheel deceleration is no longer exceeded. However, since the hold-on capacitor is still charged above the threshold level, this occurrence has no operational consequence.

At time 22, the low deceleration detecting circuit 136 turns off which thereby terminates the charging of the hold-on capacitor 170 into the hold-on capacitor charge current sink 174 through line 178. As a result, the capacitor begins to discharge as illustrated. At the same time, the two-level threshold circuit 164 switches to the lower level since the output signal on line 162 from the buffer circuit 144 has terminated. The threshold raiser and slip generator 154 provides its output signal on line 254 since the low deceleration detecting circuit 136 is now off while the low acceleration detecting circuit 210 is providing its output signal.

At time 23, the low acceleration detecting circuit 210 turns off thereby terminating the threshold raiser and slip generator output signal on line 254.

At time 24, the charge level on the hold-on capacitor 170 reaches the low level threshold then in effect which results in the termination of the output signal on line 196 from the hold-on capacitor voltage comparison circuit 192. Since it was the output signal on line 196 which was maintaining the brake pressure modulating valve in the brake release condition, the brakes are reapplied at time 24. Also at time 24, the hold-on capacitor 170 is reset by a large current from the hold-on reset circuit 158.

At time 25, the wheel again decelerates above the low deceleration threshold causing the low deceleration detecting circuit 136 to provide its output signal thereby causing the hold-on capacitor threshold level to switch to the higher level, and additionally, initiates the charging of the hold-on capacitor 170. At time 26, the hold-on capacitor has charged to the higher threshold level resulting in an output signal from the hold-on voltage comparison circuit 192 which results in the release of the brakes. The wheel exceeds the high deceleration threshold at time 27 without operational effect since the brakes are already released. At time 28, the wheel speed has fallen below the low speed threshold, e.g. 4 miles per hour, resulting in an output from the low speed detecting circuit 230 which is effective to double the charge rate of the hold-on capacitor 170 by opening the current path from the hold-on capacitor 170 through the current pass/block circuit 176 into the hold-on charge circit 174. At time 29, the wheel deceleration has decreased below the high deceleration threshold so that the high deceleration detecting circuit 138 switches off again without operational significance. At time 30, the charge level on the hold-on capacitor 130 has reached the saturation level of the hold-on charge circuit 174 so that further charging of the hold-on capacitor 170 does not occur. Note that the wheel has reached a locked condition subsequent to time 28 by virtue of the extremely low mu surface on which the vehicle is operating.

When the vehicle again encounters a high mu surface, the wheel begins to spin up rapidly so that the low wheel acceleration threshold is exceeded at time 31, and almost concurrently, the high wheel acceleration threshold is exceeded at time 32. At time 31, the hold-on capacitor 170 begins to discharge at its normal rate while at time 32 the hold-on capacitor 170 begins to discharge at double its normal rate by virtue of the opening of the second discharge path through the current pass/divert circuit 184. Also, at time 32, the brakes are reapplied since the output from the high acceleration detecting circuit 216 overrides the output from the hold-on voltage comparison circuit 192.

At time 33, the low deceleration detecting circuit 136 switches off. The two-level threshold circuit 164 does not switch to its lower level upon the termination of the output of the low deceleration detecting circuit 136 since the low speed detector 230 continues to supply its output to the two-level threshold circuit 164.

At time 34, the wheel speed has recovered above the low speed level which results in the termination of the output signal of the low speed detector 230 and the switching of the hold-on capacitor threshold reference level to the lower value. At time 35 the wheel acceleration no longer exceeds the high acceleration threshold so that the override at the output AND circuit 202 on line 218 from the high acceleration detecting circuit 216 terminates to again cause the brakes to be released. Aslo at time 35, the discharge path through the current pass/divert circuit 184 is terminated as the output signal from the high acceleration detecting circuit 216 on line 120 changes to the high level.

At time 36, the low acceleration detecting circuit 210 turns off. Accordingly, the capacitor continues to discharge at the minimum level fixed by the fixed reference current generator 238. At time 37, the hold-on capacitor 170 has charged to the low threshold level, which is then in effect, which results in the termination of the output signal from the hold-on capacitor voltage comparison circuit 192 and the reapplication of the brakes. Termination of the hold-on capacitor voltage comparison circuit output signal on line 198 activates the hold-on reset circuit 158 to rapidly discharge the hold-on capacitor to the original level as illustrated. After time 37, the stop continues normally to completion.

In view of the above description of the exemplary skid control systems 10, 62 and 110, it will be appreciated that the hold-on capacitor 24 or 170 is charged and discharged in accordance with wheel speed, acceleration and deceleration conditions. These conditions represent the braking behavior of the wheel during the skid controlled stop, and particularly, the severity of the skid condition and the rate of recovery of the wheel from the skid condition. By using more than one charge or discharge rate for the hold-on capacitor 24 or 170, these conditions can be "weighted" to better represent their significance in determining the severity of the skid condition and the rate of the wheel's recovery from the skid condition.

Relative to the skid control system 10, the hold-on capacitor discharge rate is established in accordance with the recovery of the wheel from the skid condition as determined by the termination of the skid detector output signal or the occurrence of the skid recovery detector output signal. A double rate of discharge is placed in effect when there is no skid detector output signal and the charge on the hold-on capacitor is below the threshold level. Relative to the skid control system 110, the hold-on capacitor is discharged in accordance with the acceleration of the wheel so that the acceleration of the wheel is proportionally weighted and used as an indicator of the recovery of the wheel from a skid condition. In the case of a very severe skid in which the wheel speed declines below the low speed threshold, the capacitor charge rate is doubled so as to tend to maintain the brakes released for a longer period of time to allow full wheel speed recovery from the low speed. During the double charge rate period, the rate of discharge is still in accordance with wheel acceleration. Therefore, in the case of a rapid recovery from a skid, i.e. when the high acceleration threshold has been exceeded, the hold-on capacitor 170 is discharged at double the ordinary rate to shorten the period of time of brake release. A third very rapid discharge rate is used to reset the capacitor when the hold-on capacitor voltage falls below the reference level.

The skid control system 110 further features two rates of charge of the hold-on capacitor with a first higher rate being in effect upon the occurrence of both a low deceleration detector output signal and a low speed signal and a second lower rate being in effect upon the sole occurrence of a low deceleration detector output signal. Thus, the flexibility of the system and its responsiveness to skid conditions at the wheels is enhanced. The skid control system still further features two reference levels for the hold-on capacitor comparison circuit to further enhance its flexibility and its responsiveness to a skid condition. For example, a reference level representative of a lower hold-on capacitor charge level is placed in effect when the wheel is below the low speed threshold to lengthen the brake release time.

Also, relative to the skid control system 110, note that the release of the brakes is often controlled on high coefficient of friction surfaces by the hold-on capacitor since the wheel may not achieve the high deceleration rate for brake release on the high mu surface. Further note that the hold-on capacitor normally controls the brake reapplication on low mu surfaces since the wheel ordinarily will not attain the high acceleration rate for brake reapplication.

The present skid control circuits are especially well adapted for use with a hydraulically operated brake pressure modulating valve, i.e., one having a hydraulic actuator responsive to a source of hydraulic pressure for relieving and reapplying the brakes, since the control functions provided thereby are well complemented by the speed and accuracy of brake pressure control provided by hydraulically operated modulating valves.

It is to be understood that the foregoing description is that of preferred embodiments of the invention. Various changes and modifications may be made without departing from the spirit and scope of the invention as defined by the appended claims.

What is claimed is:

1. A skid control system for a vehicle having a wheel and a brake for the wheel comprising:
    a wheel speed sensor for providing an output signal representative of the speed of said wheel;
    a skid detector responsive to said wheel speed sensor output signal for detecting a skid condition at said wheel and for providing an output signal representative of said detected skid condition;
    a skid recovery detector responsive to said wheel speed sensor output signal for detecting the recovery of said wheel from a skid condition and for providing an output signal representative of said recovery;
    timing means, including charge storage means, and charging means for charging said charge storage means in response to said skid detector output signal so that the level of charge achieved by said charge storage means during charging thereof is in accordance with the duration of said skid detector output signal, and discharging means for discharging said charge storage means in response to said skid recovery detector output signal, for providing an output signal in accordance with the level of charge of said charge storage means; and
    output means for relieving the brake for said wheel at least at times in response to skid detector output signal and for maintaining the brake for said wheel relieved at least at times in response to said timing means output signal and for reapplying the brakes at least at times in response to said skid recovery output signal regardless of said timing means output signal.

2. A skid control system according to claim 1 wherein said charging means charges said charge storage means at least at times during the duration of said skid detector output signal.

3. A skid control system according to claim 2 wherein said discharging means also discharges said charge storage means in response to the termination of said skid detector output signal.

4. A skid control system according to claim 1 wherein said timing means includes a comparator for comparing said charge level to a reference level and for providing an output signal in accordance with the comparison of said charge level with said reference level.

5. A skid control system according to claim 1 wherein said output means includes a brake pressure modulating valve having a hydraulic actuator actuable for relieving and reapplying the brake for said wheel, a source of hydraulic pressure, and means associated with said source of hydraulic pressure and said hydraulic actuator for controlling the actuation of said hydraulic actuator for relieving and reapplying the brake for said wheel.

6. A skid control system for a vehicle having a wheel and a brake for the wheel comprising:
    a wheel speed sensor for providing an output signal representative of the speed of said wheel;
    a skid detector responsive to said wheel speed sensor output signal for detecting a skid condition at said wheel and for providing an output signal representative of said detected skid condition;
    a skid recovery detector responsive to said wheel speed sensor output signal for detecting the recovery of said wheel from a skid condition and for providing an output signal representative of said recovery;
    timing means, including charge storage means, charge means for charging said charge storage means responsive to said skid detector output signal, and discharge means for discharging said charge storage means responsive to said skid recovery detector output signal for providing an output signal in accordance with the level of charge of said charge storage means; and
    output means for relieving the brake for said wheel at least at times in response to skid detector output signal and for maintaining the brake for said wheel relieved at least at times in response to said timing means output signal, for reapplying the brakes at least at times in response to said skid recovery output signal regardless of said timing means output signal, and
    additionally reapplying the brakes for said wheel at least at times in response to the termination of said skid detector output signal.

7. A skid control system for a vehicle having a wheel and a brake for the wheel comprising:
    a wheel speed sensor for providing an output signal representative of the speed of said wheel;
    a skid detector responsive to said wheel speed sensor output signal for detecting a skid condition at said wheel and for providing an output signal representative of said detected skid condition;
    a skid recovery detector responsive to said wheel speed sensor output signal for detecting the recovery of said wheel from a skid condition and for providing an output signal representative of said recovery;

timing means responsive at least at times to said skid detector output signal and said skid recovery detector output signal for providing an output signal in accordance with the occurrences thereof, said timing means including charging means for charging said charge storage means for the duration of said skid detector output signal and discharging means connected to said charge storage means for discharging said charge storage means at a first rate in response to a first predetermined event and for discharging said charge storage means at a second rate in response to a second predetermined event; and output means for relieving the brake for said wheel at least at times in response to skid detector output signal and for maintaining the brake for said wheel relieved at least at times in response to said timing means output signal.

8. A skid control system according to claim 7 wherein said second rate is greater than said first rate.

9. A skid control system according to claim 7 wherein said discharging means discharges said charge storage means at said first rate in response to the termination of said skid detector output signal and discharges said charge storage means at said second rate in response to said skid recovery detector output signal.

10. A skid control system according to claim 9 wherein said second rate is greater than said first rate.

11. A skid control system according to claim 10 wherein said discharging means discharges said charge storage means at said second rate in response to said skid recovery detector output signal only subsequent to the termination of said skid detector output signal.

12. A skid control system according to claim 11 wherein said discharging means discharges said charge storage means at said first rate during the existence of both said skid detector output signal and said skid recovery detector output signal.

13. A skid control system according to claim 7 wherein said discharging means discharges said charge storage means at said second rate when the charge on said charge storage means is below a preselected level.

14. A skid control system according to claim 13 wherein said second rate is greater than said first rate.

15. A skid control system for a vehicle having a wheel and a brake for the wheel comprising:

a wheel speed sensor for providing an output signal representative of the speed of said wheel;

a skid detector responsive to said wheel speed sensor output signal for detecting a skid condition at said wheel and for providing an output signal representative of said detected skid condition;

a skid recovery detector responsive to said wheel speed sensor output signal for detecting the recovery of said wheel from a skid condition and for providing an output signal representative of said recovery;

timing means, including charge storage means, charging means for charging said charge storage means at a predetermined rate at least at times in response to said output signal from said skid detector, and discharging means for discharging said charge storage means in response to said skid recovery detector output signal and for discharging said charge storage means at a predetermined rate during the absence of a signal from said skid detector, said timing means providing an output signal when the charge on said charge storage means is above a preselected charge level.

16. A skid control system for a vehicle having a wheel and a brake for the wheel comprising:

a wheel speed sensor for providing an output signal representative of the speed of the wheel; and skid detecting means including a capacitor, a transistor and a biasing circuit for said transistor for providing an output signal in response to said wheel speed sensor output signal, said capacitor, transistor and said biasing circuit being arranged so that said output signal has a first substantially constant magnitude in response to a first wheel speed behavior indicating a skid condition of a first predetermined severity and has a second different substantially constant magnitude in response to a second wheel speed behavior indicating a skid condition of a second predetermined severity which is greater than said first predetermined severity, said response of said skid detecting means to said skid conditions of said first and second predetermined severities including termination of said output signal substantially immediately after the termination of said first wheel speed behavior and maintenance of said output signal for a predetermined period after the termination of said second wheel speed behavior.

17. A skid control system according to claim 16 wherein said first and second predetermined severities of a skid condition are determined at least in part in accordance with the rate of change of said wheel speed sensor output signal.

18. A skid control system according to claim 16 further including a brake pressure modulating valve having a hydraulic actuator actuable for relieving the brake for said wheel, a source of hydraulic pressure, and means associated with said source of hydraulic pressure and said hydraulic actuator for controlling the actuation of said hydraulic actuator in response to said skid detecting means output signal for relieving the brake for said wheel.

19. A skid control system for a vehicle having a wheel and a brake for the wheel comprising:

a wheel speed sensor for providing an output signal representative of the speed of the wheel; and skid detecting means including a capacitor, a transistor and a biasing circuit for said transistor being responsive to said wheel speed sensor output signal and arranged for providing an output signal having a first substantially constant magnitude in response to a skid condition having a severity between first and second predetermined degrees of severity and a second different substantially constant magnitude in response to a skid condition having a severity above said second predetermined degree of severity.

20. A skid control system according to claim 19 wherein said first and second predetermined degrees of severity of a skid condition are determined at least in part in accordance with the rate of change of said wheel speed sensor output signal.

21. A skid control system according to claim 19 further including a brake pressure modulating valve having a hydraulic actuator for relieving the brake for said wheel, a source of hydraulic pressure, and means associated with said source of hydraulic pressure and said hydraulic actuator for controlling the actuation of said hydraulic actuator in response to said skid detecting means output signal for relieving the brake for said wheel.

22. A skid control system for a vehicle having a wheel and a brake for the wheel comprising:
- a wheel speed sensor for providing an output signal representative of the speed of the wheel; and
- skid detecting means including control conduction means having an input responsive to said wheel speed signal and an output for providing an output signal having a first substantially constant magnitude in response to decelerations of said wheel between first and second magnitudes of deceleration of said wheel and having a second different substantially constant magnitude in response to decelerations of said wheel above said second magnitude of deceleration of said wheel with said second magnitude of deceleration of said wheel being greater than said first preselected magnitude of deceleration of said wheel,
- said skid detecting means being adapted so that said output signal having said first magnitude is terminated substantially when said wheel deceleration falls below said first magnitude of deceleration and, in the event said wheel deceleration exceeds said second magnitude of deceleration so that said output signal is provided having said second magnitude, said output signal is maintained subsequent to said wheel deceleration falling below said second magnitude of deceleration for a period determined at least in part in accordance with the degree that the wheel deceleration exceeds said second magnitude of wheel deceleration.

23. A skid control system according to claim 22 further including a brake pressure modulating valve having a hydraulic actuator actuable for relieving the brake for said wheel, a source of hydraulic pressure, and means associated with said source of hydraulic pressure and said hydraulic actuator for controlling the actuation of said hydraulic actuator in response to said skid detecting means output signal for relieving the brake for said wheel.

24. A skid control system for a vehicle having a wheel and a brake for the wheel comprising:
- a wheel speed sensor for providing an output signal representative of the speed of the wheel;
- skid detecting means being responsive to said wheel speed sensor output signal for providing an output signal having a first characteristic in response to a skid condition having a severity between first and second predetermined degrees of severity and a second characteristic in response to a skid condition having a severity above said second predetermined degree of severity;
- means for detecting the first cycle in a series of skid control cycles with each skid control cycle being initiated by said skid detecting means output signal and each cycle of said series of skid control cycles occurring within a predetermined period subsequent to the previous skid control cycle; and
- means responsive to said skid detecting means output signal for utilizing said skid detecting means output signal and having a differing response only on said first skid control cycle as determined by said first cycle detecting means in accordance with said first and second characteristics of said output signal.

25. A skid control system according to claim 24 wherein said utilizing means includes means for relieving the brake of said wheel for the duration of said skid detecting means output signal, wherein said skid detecting means output signal is maintained subsequent to the provision of said output signal having either said first or second characteristic on each cycle of said series of skid control cycles, and wherein said skid detecting means output signal is maintained subsequent to the provision of said output signal having said second characteristic on said first skid control cycle.

26. A skid control system according to claim 24 further including a brake pressure modulating valve having a hydraulic actuator actuable for relieving the brake for said wheel, a source of hydraulic pressure, and means associated with said source of hydraulic pressure and said hydraulic actuator for controlling the actuation of said hydraulic actuator in response to said skid detecting means output signal for relieving the brake for said wheel.

27. A skid control system for a vehicle having a wheel and a brake for the wheel comprising:
- a wheel speed sensor for providing an output signal representative of the speed of the wheel;
- skid detecting means for providing an output signal in response to said wheel speed sensor output signal, said skid detecting means having a first response to a wheel speed signal behavior indicating a skid condition of a first predetermined severity and having a second response to a wheel speed signal behavior indicating a skid condition of a second predetermined severity which is greater than said first predetermined severity, said response of said skid detecting means to said indicated skid conditions of said first and second predetermined severities including termination of said output signal substantially immediately after the termination of said indication of a skid condition of said first predetermined severity and maintenance of said output signal for a predetermined period after the termination of said indication of a skid condition having said second predetermined severity with said predetermined period varying in accordance with the severity of said skid condition;
- skid recovery detecting means for detecting the recovery of said wheel from a skid condition for providing an output signal representative thereof; and
- output means for relieving and reapplying the brake of said wheel which is responsive to said skid detecting means and said skid recovery means in a manner to relieve the brake at least at times in response to the occurrence of said skid detecting means output signal and to reapply the brake in response to the termination of said skid detecting means output signal in the absence of a skid recovery detecting output signal and in response to the occurrence of said skid recovery detecting means output signal regardless of whether said skid detecting means output signal has been terminated.

28. A skid control system according to claim 27 wherein said severity of the detected skid condition is determined at least in part in accordance with the rate of change of said wheel speed signal.

29. A skid control system according to claim 27 wherein said output means includes a brake pressure modulating valve having a hydraulic actuator actuable for relieving and reapplying the brake for said wheel, a source of hydraulic pressure, and means associated with said source of hydraulic pressure and said hydraulic actuator for controlling the actuation of said hydraulic actuator for relieving and reapplying the brake for said wheel.

30. A skid control system according to claim 27 wherein said skid recovery detector provides said skid recovery detector output signal in response to a predetermined wheel acceleration.

31. A skid control system for a vehicle having a wheel and a brake for the wheel comprising:
- a wheel speed sensor for providing an output signal representative of the speed of said wheel;
- detecting means responsive to said wheel speed sensor output signal for providing an output signal upon a predetermined wheel speed related condition during wheel deceleration;
- a skid recovery detector responsive to said wheel speed sensor output signal for detecting the recovery of said wheel from a skid condition and for providing an output signal representative of said recovery;
- timing means, including charge storage means, charging means for charging said charge storage means in response to said detecting means output signal, and discharging means for discharging said charge storage means in response to said skid recovery detector output signal for providing an output signal in accordance with the level of charge of said charge storage means; and
- output means for releasing and reapplying the brake for said wheel with the brake being reapplied at least at times in response to said timing means output signal and at least at times in response to said skid recovery output signal regardless of said timing means output signal.

32. A skid control system according to claim 31 wherein said output means additionally reapplies the brakes for said wheel at least at times in response to the termination of said detecting means output signal.

33. A skid control system according to claim 31 wherein said charging means charges said charge storage means at least at times during the duration of said detecting means output signal.

34. A skid control system according to claim 33 wherein said discharging means also discharges said charge storage means in response to the termination of said detecting means output signal.

35. A skid control system according to claim 31 wherein said discharging means discharges said charge storage means at a first rate in response to the termination of said detecting means output signal and discharges said charge storage means at a second different rate in response to said skid recovery detector output signal.

36. A skid control system according to claim 35 wherein said second rate is greater than said first rate.

37. A skid control system according to claim 36 wherein said discharging means discharges said charge storage means at said second rate in response to said skid recovery detector output signal only subsequent to the termination of said detecting means output signal.

38. A skid control system according to claim 37 wherein said discharging means discharges said charge storage means at said first rate during the existence of both said detecting means output signal and said recovery detector output signal.

39. A skid control system according to claim 31 wherein said discharging means discharges said charge storage means at a first rate when the charge on said charge storage means is above a preselected level and discharges said charge storage means at a second different rate when the charge on said charge storage means is below a preselected level.

40. A skid control system according to claim 39 wherein said second rate is greater than said first rate.

41. A skid control system according to claim 31 wherein said timing means includes a comparator for comparing said charge level to a reference level and for providing an output signal in accordance with the comparison of said charge level with said reference level.

42. A skid control system according to claim 41 wherein said timing means includes means for providing two reference levels.

43. A skid control system according to claim 42 wherein one of said reference levels is selected in accordance with wheel behavior.

44. A skid control system according to claim 42 wherein one of said reference levels is selected in accordance with wheel speed.

45. A skid control system according to claim 31 wherein said timing means includes charge storage means which is charged at a predetermined rate at least at times in response to said output signal from said detecting means and which is discharged at a predetermined rate during the absence of a signal from said detecting means, and wherein said timing means provides said timing means output signal when the charge on said charge storage means is above a preselected charge level.

46. A skid control system according to claim 31 wherein said output means includes a brake pressure modulating valve having a hydraulic actuator actuable for relieving and reapplying the brake for said wheel, a source of hydraulic pressure, and means asociated with said source of hydraulic pressure and said hydraulic actuator for controlling the actuation of said hydraulic actuator for relieving and reapplying the brake for said wheel.

47. A skid control system according to claim 31 wherein said charging means is adapted to provide two rates of charging of said charge storage means.

48. A skid control system according to claim 31 wherein said discharging means is adapted to provide two rates of discharging of said charge storage means.

49. A skid control system according to claim 48 wherein said discharging means is adapted to provide three rates of discharging of said charge storage means.

50. A skid control system according to claim 31 wherein said charging means is adapted to provide two rates of charging of said charge storage means and said discharging means is adapted to provide two rates of discharging of said charge storage means.

51. A skid control system for a vehicle having a wheel and a brake for the wheel comprising:
- a wheel speed sensor for providing an output signal representative of the speed of said wheel;
- control means responsive to said wheel speed signal including charge storage means, charging means for charging said charge storage means and discharging means for discharging said charge storage means, said control means being adapted for charging said charge storage means via said charging means at a first rate in response to a first predetermined event and at a second rate in response to a second predetermined event,
- said first and second predetermined events being determined in accordance with characteristics of said wheel speed signal which are indicative of the occurrence of a skid condition at said wheel so that the level of charge on said charge storage means attained during charging thereof is representative of the severity of said skid condition, said control means providing a control means output signal in accordance with the level of charge on said charge storage means; and output means for controlling the brake for said wheel at least at times in response to said control means output signal.

52. A skid control system according to claim 51 wherein said discharging means is adapted to provide two rates of discharging of said charge storage means.

53. A skid control system according to claim 52 wherein said discharging means is adapted to provide three rates of discharging of said charge storage means.

54. A skid control system for a vehicle having a wheel and a brake for the wheel comprising:
- a wheel speed sensor for providing an output signal representative of the speed of said wheel;
- control means responsive to said wheel speed signal including charge storage means, charging means for charging said charge storage means, discharging means for discharging said charge storage means, means for causing charging and discharging of said charge storage means by said charging means and said discharging means in accordance with said wheel speed signals so that the charge level on said charge storage means represents at least at times the magnitude of a skid condition at said wheel, reference means for providing a reference signal having at least two reference levels with said reference levels being provided in accordance with the behavior of said wheel, and comparator means for comparing the charge on said charge storage means and said reference signal for providing an output signal when said charge level attains said reference signal level; and
- output means for controlling the brake for said wheel at least at times in response to said control means output signal.

55. A skid control system according to claim 54 wherein said charging means is adapted to provide two rates of charging of said charge storage means.

56. A skid control system according to claim 54 wherein said discharging means is adapted to provide two rates of discharging of said charge storage means.

57. A skid control system according to claim 56 wherein said discharging means is adapted to provide three rates of discharging of said charge storage means.

58. A skid control system according to claim 54 wherein said charging means is adapted to provide two rates of charging of said charge storage means and said discharging means is adapted to provide two rates of discharging of said charge storage means.

59. A skid control system for a vehicle having a wheel and a brake for the wheel comprising:
- a wheel speed sensor for providing an output signal representative of the speed of said wheel;
- a skid detector responsive to said wheel speed sensor output signal for detecting a skid condition at said wheel and for providing an output signal representative of the detected skid condition;
- rate detector means responsive to said wheel speed sensor output signal for providing an output signal having a magnitude representative of the magnitude of the rate of change of said wheel speed signal;
- timing means, including charge storage means, and charging control means for charging said charge storage means in response to said skid detector output signal so that the level of charge achieved by said charge storage means is in accordance with the duration of said skid detector output signal, said charging control means further variably controlling the rate of charge of said charge storage means in accordance with the magnitude of said rate detector means output signal so that the level of charge of said charge storage means is in accordance with the magnitude of the rate of change of said wheel speed signal, said timing means providing an output signal in accordance with the level of charge of said charge storage means; and
- output means for controlling the relief of the brake for said wheel at least at times in response to said timing means output signal so that the brake for said wheel will be relieved for a period in accordance with the charge on said charge storage means.

60. A skid control system according to claim 59 wherein said charging control means is responsive to said rate detector means output signal for discharging said charge storage means in accordance with the rate of change of said wheel speed signal.

61. A skid control system according to claim 60 wherein said rate detector means detects the rate of spin-up of said wheel so that said charging control means discharges said charge storage means in accordance with the rate of spin-up of said wheel.

62. A skid control system according to claim 59 wherein said rate detector means detects the rate of spin-up of said wheel subsequent to the relief of said brake for said wheel so that the level of charge of said charge storage neans is in accordance with the rate of recovery of said wheel from a skid condition.

63. A skid control system according to claim 62 wherein said capacitor is discharged in accordance with the rate of spin-up of said wheel subsequent to the relief of said brake for said wheel.

64. A skid control system according to claim 63 wherein said capacitor is discharged proportionately to the rate of spin-up of said wheel subsequent to the relief of said brake for said wheel.

65. A skid control system for a vehicle having a wheel and a brake for the wheel comprising:
- a wheel speed sensor for providing an output signal representative of the speed of said wheel;
- control means responsive to said wheel speed signal ncluding charge storage means, charging means for charging said charge storage means, discharging means for discharging said charge storage means, means for causing charging and discharging of said charge storage means by said charging means and said discharging means in accordance with said wheel speed signals so that the charge level on said charge storage means represents at least the magnitude of a skid condition at said wheel, reference means for providing a reference signal having at least two reference levels with said reference levels being provided in accordance with said wheel speed signal, and comparator means for comparing the charge on said charge storage means and said reference signal for providing an output signal when said charge level attains said reference signal level; and output means for controlling the brake for said wheel at least at times in response to said control means output signal.

66. A skid control system according to claim 65 wherein said reference means changes from a first reference level to a second reference level when said wheel speed signal indicates a wheel speed below a predetermined wheel speed.

67. A skid control system according to claim 65 wherein said reference means provides a reference signal representing a lesser magnitude of a skid condition when said wheel speed signal indicates a wheel speed below a predetermined wheel speed so that said charge level attains said reference signal level at an later point in time than said charge level attains the other of said two reference levels.

* * * * *

UNITED STATES PATENT AND TRADEMARK OFFICE
CERTIFICATE OF CORRECTION

PATENT NO. : 3,966,266
DATED : June 29, 1976
INVENTOR(S) : THOMAS M. ATKINS

It is certified that error appears in the above-identified patent and that said Letters Patent are hereby corrected as shown below:

Column 1, line 67, "period" should be --periods--.

Column 6, line 4, "$e_a'$" should be --$e'_a$--.

Column 7, line 49, "fall" should be --falls--.

Column 23, line 28, "pass-divert" should be --pass/divert--.

Column 30, line 65, Claim 21, line 3, after "actuator", insert --actuable--.

Signed and Sealed this

Sixteenth Day of November 1976

[SEAL]

Attest:

RUTH C. MASON
*Attesting Officer*

C. MARSHALL DANN
*Commissioner of Patents and Trademarks*